United States Patent [19]
Dillman et al.

[11] Patent Number: 5,689,906
[45] Date of Patent: Nov. 25, 1997

[54] METHOD AND APPARATUS FOR PREPARING GROUND SURFACE FOR TREE PLANTING

[75] Inventors: Douglas W. Dillman, Manning; Timothy W. Vinge, Fairview; Allen A. Pusch, Calgary; Minoru Saruwatari, Calgary; S. Carl Zanon, Calgary, all of Canada

[73] Assignee: Canadian Forest Products, Inc., Vancouver, Canada

[21] Appl. No.: 665,896

[22] Filed: Jun. 19, 1996

[51] Int. Cl.$^6$ .................................... E02F 3/00
[52] U.S. Cl. .................... 37/418; 172/177; 172/237
[58] Field of Search ................... 111/52, 112, 166, 111/100, 103, 139, 924; 172/112, 166, 196, 413, 438, 177, 237; 37/403, 417, 418

[56] References Cited

U.S. PATENT DOCUMENTS

| | | | |
|---|---|---|---|
| 2,780,975 | 2/1957 | Gunning | 172/177 X |
| 3,561,540 | 2/1971 | Kaszkurewicz | 172/111 |
| 4,331,204 | 5/1982 | White | 172/70 |
| 4,416,335 | 11/1983 | Lofgren et al. | 172/121 X |
| 4,508,177 | 4/1985 | Wiser | 172/177 |
| 4,762,181 | 8/1988 | Cox | 172/196 |
| 4,945,663 | 8/1990 | Nilsson | 37/118 A |
| 5,210,964 | 5/1993 | Lam et al. | 37/118 R |
| 5,322,129 | 6/1994 | Sheeter | 172/2 |

FOREIGN PATENT DOCUMENTS

| | | | |
|---|---|---|---|
| 1329888 | 5/1994 | Canada | 97/37 |
| 2248646 | 4/1992 | United Kingdom . | |

OTHER PUBLICATIONS

Synopsis, Mounding for Site Preparation FRDA Memo No. 100, Jul. 1989.
Silviculture, Development of a Silviculture Mounding Attachment, Technical Note TN–183, Sep. 1992.

*Primary Examiner*—Terry Lee Melius
*Assistant Examiner*—Robert Pezzuto
*Attorney, Agent, or Firm*—Sand & Sebolt

[57] ABSTRACT

An apparatus and method for preparing sites for planting tree seedlings, and more particularly establishing mounds on the ground surface formed of soil scooped from the ground. The apparatus may be of the pull type having a pair of scoops and scoop operators for moving the scoop through a ground penetrating and mound depositing cycle. A control times the cycling of the operations so that the mounds formed during a constant movement in the forward direction are arranged in two lines and wherein the mounds in the two lines may be in a staggered relationship. The apparatus has rear wheels and a front towbar. Actuators are provided for moving the wheels up or down relating to the frame and also moving the towbar so that the height, as well as the fore and aft tilt, of the frame relative to the ground can be varied to control the depth of penetration of the scoops. The wheels also have actuators which allows adjustment of the tread of the wheels.

16 Claims, 18 Drawing Sheets

TOTAL AREA 16.0 IN CUT DEPTH

556 SQ IN

DUFF AREA 6.0 IN DUFF

282 SQ IN

MINERAL AREA 10.0 IN MINERAL

274 SQ IN

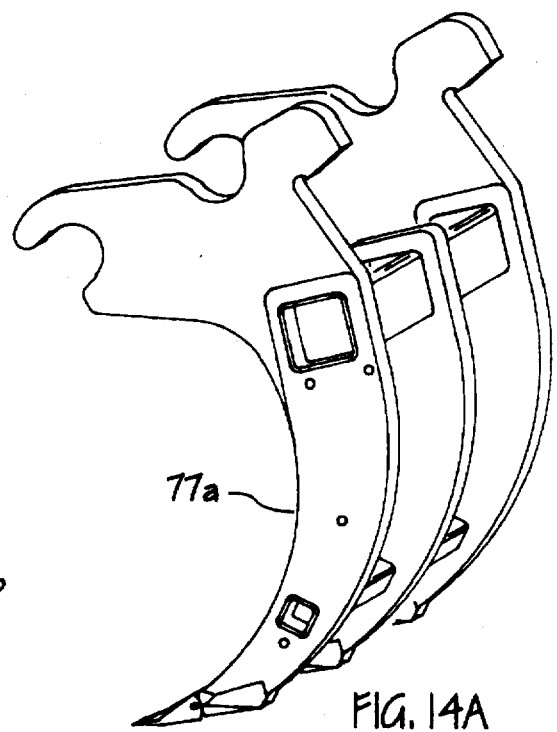
FIG. 14A
FIG. 14B
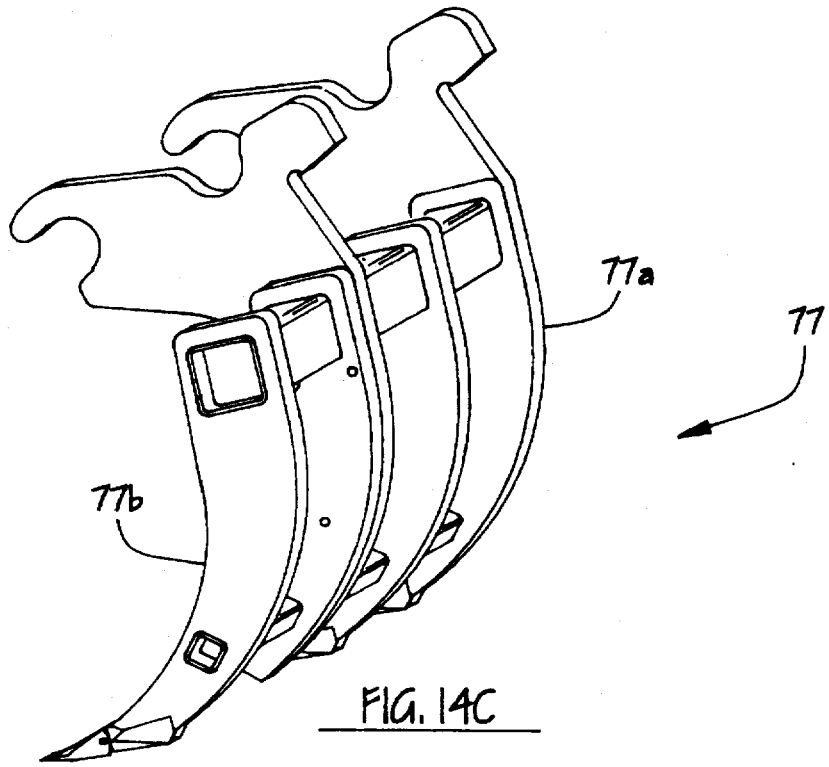
FIG. 14C

METHOD AND APPARATUS FOR PREPARING GROUND SURFACE FOR TREE PLANTING

BACKGROUND OF THE INVENTION

1. Field of the Invention

This invention relates to an apparatus and a method for forming mounds on the surface of the ground, and particularly to the forming of mounds which provide a site for transplanting a tree seedling in a reforestation process.

2. Description of the Prior Art

Recently it has been discovered in the field of silviculture that tree seedlings have a better survival rate and more rapid growth when planted on a mound of earth, this being particularly the case when the conditions are cold and wet. When a portion of the soil surface is removed and inverted a double layer of duff is formed, the term duff as used herein meaning the natural humus and/or top soil at the site. When the removed portion of earth is dug sufficiently deep, the resulting inverted mound is capped with mineral material or clay. The roots of the seedling have the advantage of having access to the double layer of duff in which the nutrients exist, and the surrounding mineral cap provides a protective layer, which, for example, retards the ingress of competitive vegetation, which would otherwise tend to quickly crowd the small seedling. Moreover, the mounding process results in a more acceptable environmental condition than other heretofore utilized methods of replanting tree growth.

While some attempts have been made to develop machines which can form such mounds in a quick manner and of sufficiently uniform and correct structure to be useful in replanting vast areas requiring reforestation, equipment which is presently being marketed has not in the main been found capable of satisfactory operation in the variety of conditions, such as terrain, soils and trash coverage, which are encountered in areas previously cut of its mature tree growth Some available machines are not capable of operating in terrain which has considerable debris and uneven terrain, nor are they of a design which can provide large mounds of the type required in some regions, such as in boreal forests as found in northern Alberta. In some known designs, the amount of penetration for providing acceptable mounds or the ability to deal with difficult penetration conditions, such as when there are frost conditions, is not available. In some designs this is due to the location of the mound forming tool on the apparatus. Also in other known designs, equipped with a blade means which accomplishes deep penetration, the simultaneous operating of the pair of blades requires such high power, the cost of the prime mover, its operation and transportation needs, results in an expensive mound forming process. The machine must be of a type which allows ready transportation of it and the towing tractor from one site to another.

It is important that the machine be of rugged design and yet include features which allows for variation in the scoop function preferably by the operator to accommodate various conditions being encountered and which may vary significantly from one area to another on the same site. To maximize the usefulness of the mound, each mound must conform as closely as possible to characteristics which are found to be important, such as quantity of material, shape, relative amounts of the duff and mineral ingredients and separation of layers of the ingredients in the mound. Moreover, while it is important to provide no less than a predetermined tree spacing to allow for optimum growth to a mature forest, it is on the other hand, for the sake of economy, necessary Go obtain a maximum tree density on the plot of land to be planted.

SUMMARY OF THE INVENTION

It is an object of the present invention to provide a method and apparatus which accomplishes the required characteristics of the mound and to provide an apparatus which is sufficiently durable and yet versatile to be able to establish satisfactory mounds of an optimum density under a wide variety of conditions.

According to one aspect of the present invention, there is provided a method of forming mounds on the ground surface in preparation for planting trees, the method including the steps of moving an apparatus having a pair of earth penetrating scoops in a direction of travel over the ground surface, the scoops being positioned on the apparatus in non-alignment in relation to the direction of travel, and operating each scoop through a mound forming cycle wherein each cycle includes the sequential movement of the scoop from a retracted position through an earth penetration and mound depositing stage, followed by the return of the scoop to the retracted position. The cycle of each scoop is continuously repeated after reaching the retracted position at evenly timed intervals so that each scoop forms a series of mounds spaced along a line in the direction of travel, the lines of mounds of the two scoops being spaced transversely relative to the direction of travel. The cycles of the pair of scoops are timed to form the mounds in the two lines in a staggered relationship.

In a specific form of the method according to the present invention, the degree of transverse staggering in the two lines is varied depending on operating conditions.

According to another aspect of the invention, there is provided an apparatus for forming mounds on a ground surface being prepared for tree planting, the apparatus including a framework and ground engaging means supporting the framework above the ground surface for movement in a direction of travel. A pair of mound forming scoops are spaced transversely relative to the direction of travel, and operating means are provided for moving each scoop through a cycle including a scooping and depositing portion of the cycle and a retracting portion of the cycle, so that the pair of scoops each provide a pair of in-line series of mounds, the mounds in each line being spaced in the direction of travel, and the lines of the series of mounds formed by the pair of scoops being transversely spaced. Control means are provided for timing the cycles of the pair of scoops in relation to each other for forming the mounds in the two series in a staggered relationship.

It can be appreciated that the staggered mounds in the two lines formed on each pass allow for a more dense pattern of tree planting. The operation of the scoops out of phase with each other in this cycling significantly reduces the power requirements of the towing tractor as well as for a dedicated engine of the apparatus. Because the two lines of the mounds may be closer together because of their staggered relationship the overall width of the apparatus can be reduced, making it a more manageable implement in the woods.

According to still another aspect of the invention, there is provided an apparatus for preparation of the ground surface for tree planting, the apparatus having a framework for movement above the ground surface in a direction of travel and rear ground engaging wheels with mounting means connecting the wheels to the framework for thereby supporting a rear portion of the apparatus. Earth working means is carried by and downwardly depends from the framework forwardly of the wheels, and operating means are provided for moving the earth working means through an operating cycle including a ground engaging portion of the cycle followed by a retracting portion of the cycle.

Unlike known mound preparing machines the earth working means, which in the present invention, may be a mound forming scoops, or in the form of a rototiller structure or other earth mixing implement substituted for the scoops, is located in front of the rear machine supporting wheels. This has the advantage of being located between the wheels and the hitch of the towbar of a pull type machine so that the amount of vertical displacement experienced by the earth working means is significantly reduced from that which occurs when the earth work means is located at the very rear or the very front of the machine. Also in the above-described form of the invention, a significant portion of the total weight of the machine is available as a reactionary force to the penetration of the scoops, thus ensuring deeper penetration when required with minimum weight.

Yet another aspect of the invention resides in an apparatus for forming mounds on the ground surface in preparation for tree planting, the apparatus including a framework for movement above the ground surface in a direction of travel and mound forming scoops carried by and downwardly depending from the framework. Operating means is provided for moving the scoops through an operating cycle including a ground penetration and mound depositing portion of the cycle followed by a retracting portion of the cycle. The apparatus further includes a pair of ground engaging wheels with mounting means connecting the wheels to the framework for thereby supporting a portion of the apparatus, the mounting means including wheel positioning means for adjusting the tracking line of each wheel relative to a longitudinal central line of the framework.

The provision of the wheels which are capable of having their line of track adjusted allows for positioning of the wheels to track between the edge of the trash bed and the mounds, or alternatively the wheels can be aligned to travel over the mounds if compaction of the mound is required. During shipping the wheels can be moved inwardly to provide a minimum total width of the machine.

Still another aspect of the invention is in an apparatus of the pull type for forming mounds on the ground surface in preparation for tree planting, including a framework with a towbar projecting forward from a front portion of the framework, the towbar having coupler means at a forward end for supporting the front portion through attachment of the coupler means to a towing tractor. Mound forming scoops are carried by and downwardly depend from the framework, and scoop operating means are provided for cycling the scoops through mound forming portions of the cycle during forward movement of the apparatus over the ground surface. Ground engaging wheels support a portion of the framework rearwardly of the towbar, and wheel mounting means are provided for lowering and raising the wheels relative to the framework so that the amount of ground penetration by the scoops is variable by controlling the distance of the framework from the ground surface through selective positioning of the wheels relative to the framework.

The adjustment of the amount of penetration is important to allow continual control over the form and make-up of the mound, when, for example, the thickness of the duff layer changes. The changing of the distance between the framework and the ground can be readily controlled, for example, from the cab of the towing tractor, thus allowing for on-the-go variation of the penetration for maintaining the quality of the mound.

The invention also resides in an apparatus for forming mounds on the ground surface in preparation for tree planting during movement in a direction of travel which may be at a constant ground speed, the apparatus including a framework and ground engaging means supporting the framework above the ground surface for the movement in the direction of travel, and where there is provided mound forming scoop means carried by and depending beneath the framework. The scoop means includes an integral member defining a earth collection and directing front surface having a concave shape in cross-section taken in a vertical plane extending in the direction of travel, the curved surface of the scoop means having a lower portion extending downwardly and forwardly and terminating at a lowermost tip. Operating means are also provided for pivoting the scoop means about a pivotal axis through an operating cycle from an initially raised retracted position downwardly to an earth penetrating and mound depositing position and then upwardly to the initial retracted position. The pivot axis is disposed forward and above the lowermost tip whereby the tip swings downwardly and forwardly during the movement to a maximum earth penetration. The operating means includes an actuator for swinging the scoop means downwardly for causing the tip to penetrate the ground at a relatively constant rate over a distance of forward travel to a maximum penetration and to then swing the scoop back in an upwardly direction at a speed related to the ground speed for causing the scoop means to raise abruptly relative to forward travel to the fully retracted position.

Such a design accomplishes a well formed mound when the machine is drawn at a given speed range even though there is utilized a relatively simple form of scoop not containing any moving or vulnerable parts. The geometry of the parts forming the scoop and operating components is capable of achieving a penetration resulting in the scooped soil being thrown forward and inverted in a smooth motion without significantly disturbing the layered form of the duff and mineral. The scoop is withdrawn in a manner involving little or no absolute forward motion, and possibly some rearward motion relative to the ground, so as to clear the ground surface and the newly formed mound as it moves thereover.

BRIEF DESCRIPTION OF THE DRAWINGS

In the accompanying drawings, which show the present invention by way of examples.

FIG. 14A is a top view of an embodiment of a scoop consisting of a scoop incorporating an extension portion and FIGS. 14B and 14C are top views of a scoop and an extension portion disconnected;

DESCRIPTION OF A PREFERRED EMBODIMENT

Figure 16:
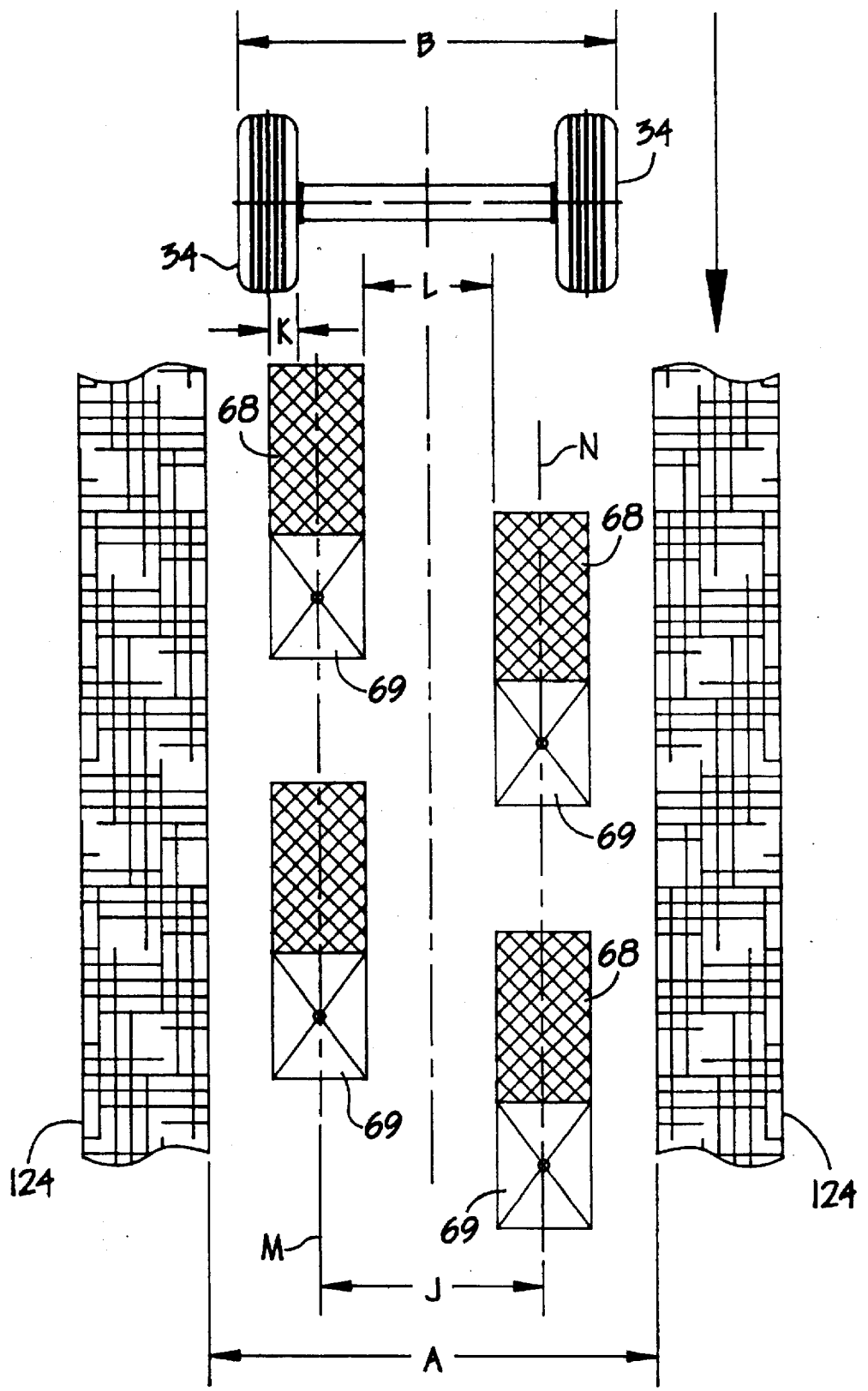
FIG. 16 is a diagram showing a mound pattern formed on a single pass.
Figure 17:
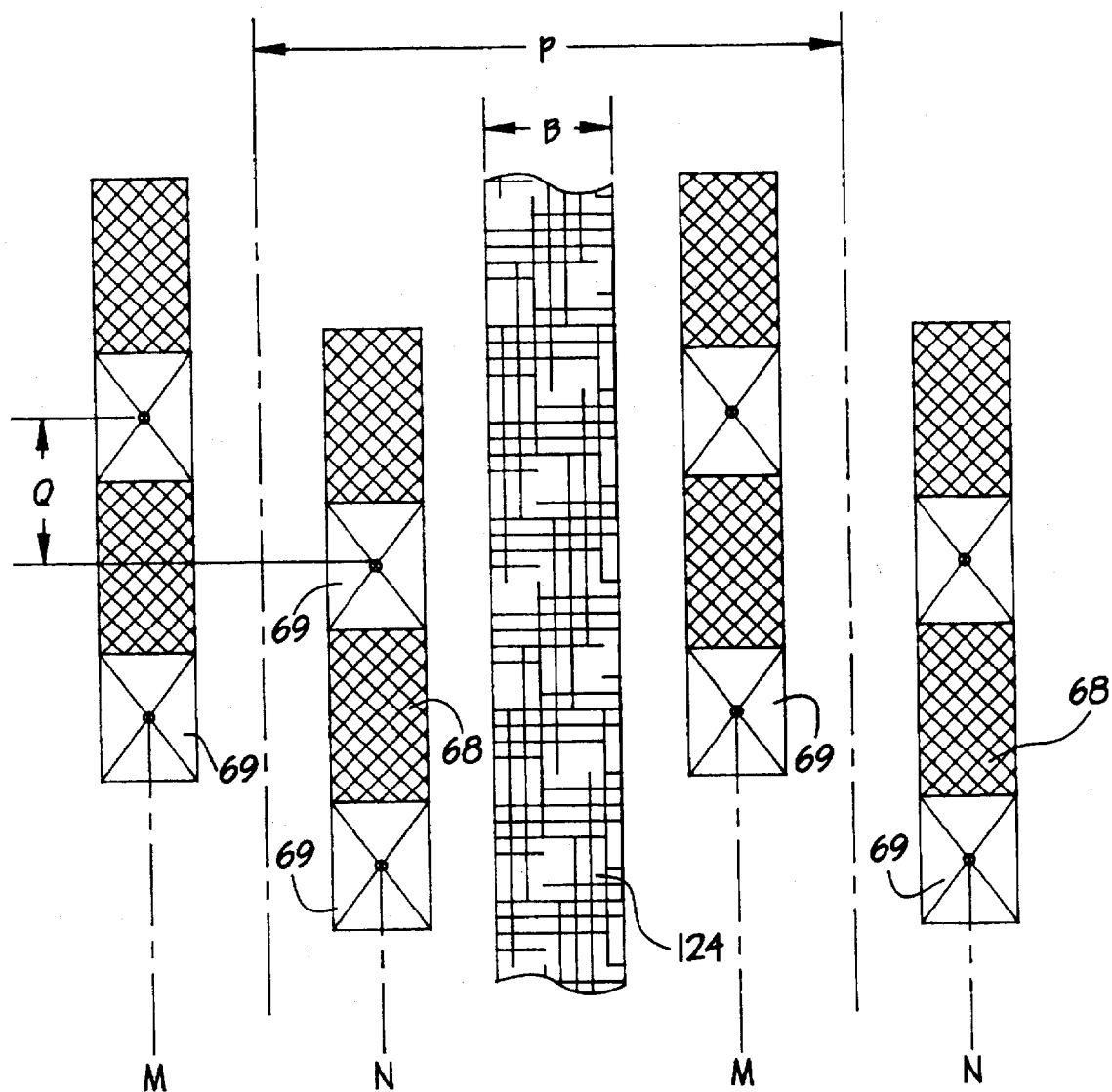
FIG. 17 shows a mound grid spacing formed by two passes of the apparatus of the present invention.

The reference characters utilized in the accompanying drawings denote like elements referred to herein. The reference character 20 generally denotes the apparatus of the present invention which is a mound forming machine for use in preparing the ground surface for use in the planting of tree seedlings, The apparatus 20 includes a platform or framework 21 which has a towbar 22 attached to the forward end and which is provided with a connection means 23 adapted to be connected to the drawbar 24 of a prime mover shown in the form of a tracked tractor 25, A trash blade 26 may be provided at the front of the tractor 25 for clearing a path as the tractor 25 is drawing the apparatus 20 at a substantially constant speed in a mound producing process. As may be seen, for example, in FIG. 16 the trash blade 26 is selected to provide a cleared path having a width indicated by A in FIG. 16. The trash is disposed on either side of the path in a trash bed by successive passes as illustrated in FIGS. 16 and 17 with the passes being controlled to maintain the width of the trash between successive passes at a selected width, such as shown at B in FIG. 16. The apparatus 20 has a dedicated engine 27 mounted on the framework 21, the engine 27 driving a pair of primary hydraulic pumps 30 and 31 (FIG. 15) and other accessories including an electrical generating unit so that the apparatus is self sufficient in its power and operating controls as will be described hereinafter. Preferably the apparatus includes a canopy structure 28 to protect the apparatus from falling debris.

The front portion of the apparatus is supported by way of its connection to the drawbar 24 of the tractor 25, and the rear portion of the apparatus is supported by ground engaging wheel means 32. The ground engaging wheel means 32 includes a mounting means 33 which allows the raising and lowering of a pair of wheels 34 relative to the framework 21. Accordingly, actuation of the mounting means 33 can be utilized in determining the position of the framework 21 above a ground surface 35 over which the apparatus 20 is being drawn by the tractor 25.

Figure 2:
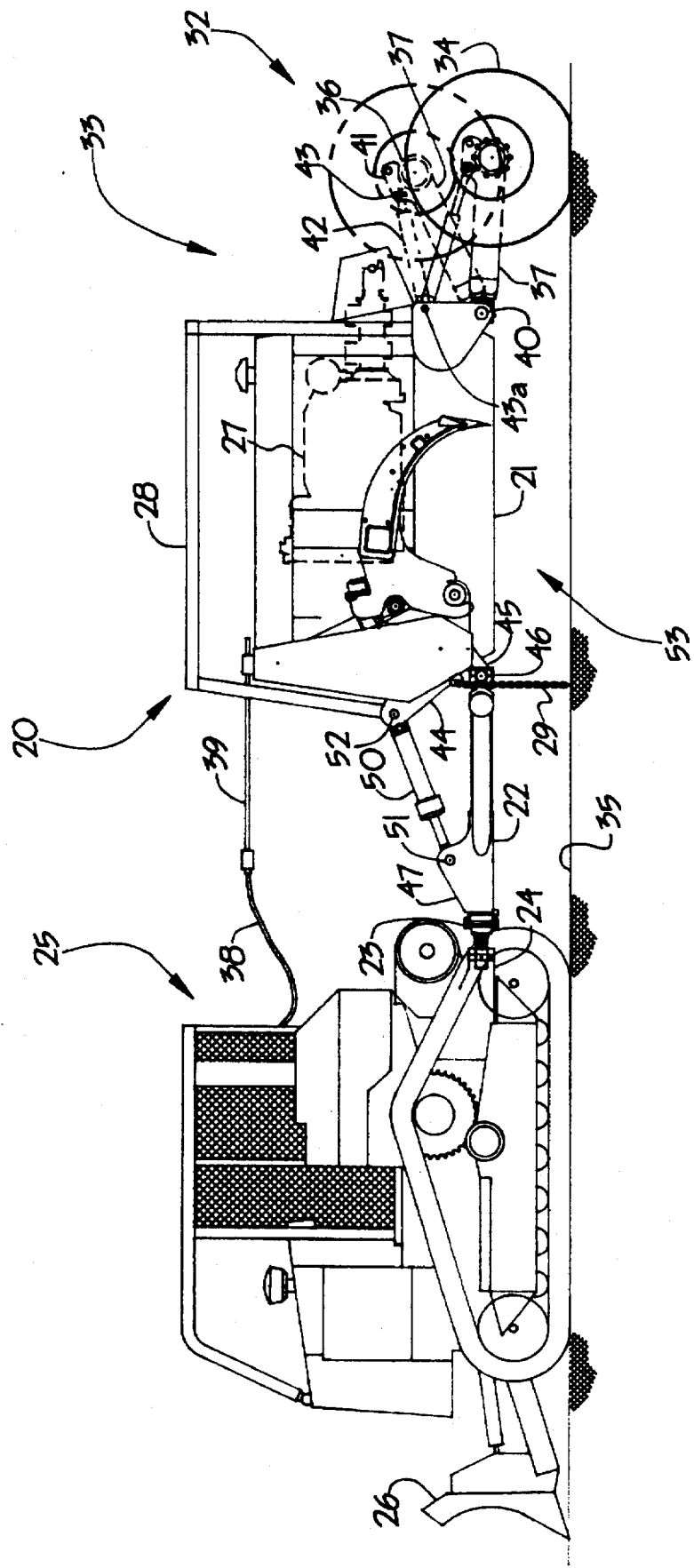
FIG. 2 is also a side view of a similar version of the apparatus of the present invention and illustrates different positions of a rear wheel mounting means.

The mounting means 33 includes a tubular axle housing 36 which has rigidly connected thereto a pair of struts 37. Pivot means 40 are provided at the forward ends of the struts for connecting the struts to the framework 21 and allowing a pivotal swinging movement of the struts about an axis which is transverse to the longitudinal axis of the apparatus. As shown in FIG. 2, lugs 41 are attached to the top of the axle housing 36, and a pair of double acting hydraulic pistons and cylinder units 42 are connected between the lugs 41 and the framework 21. As shown, a piston rod of the unit 42 is connected at the rear of the unit 42 to the lug by a pivot connection 43, and the cylinder end of the unit 42 is pivotally connected to the framework by pivot connection 43a. Accordingly, as the units 42 are expanded, the axle housing 36 is pushed downwardly, thus, due to the engagement of the wheels 34 with the ground, this action raises the rear portion of the framework 21 relative to the ground. Alternatively, upon contraction of the units 42, the axle housing 36 is swung in an upward direction relative to the framework 42 which allows the framework 21 to be lowered relative to the ground. As will be described in more detail below, the piston and cylinder units 42 may be actuated from within the cab of the tractor 25.

At the forward end of the apparatus, a frame member 44, which is integral with the framework 21, projects forwardly and upwardly over the rear portion of the towbar 22. Another frame member 45 which is also integral with the framework 21 projects forwardly and downwardly in front of the framework. The rear end of the towbar 22 is provided by the pivot connection 46 to the frame member 45 for pivotal movement in an upward and downward direction about a transverse horizontal axis provided by the pivot connection 46. Connected between the frame member 44 and an upstanding rigid flange 47 formed near the forward end of the towbar 22 is a double acting hydraulic piston and cylinder unit 50. As shown in FIG. 2, a piston rod of the unit 50 is connected to the flange by a pivot pin 51 and the cylinder end of the unit 50 is connected to the frame member 44 by a pivot pin 52.

Figure 1:
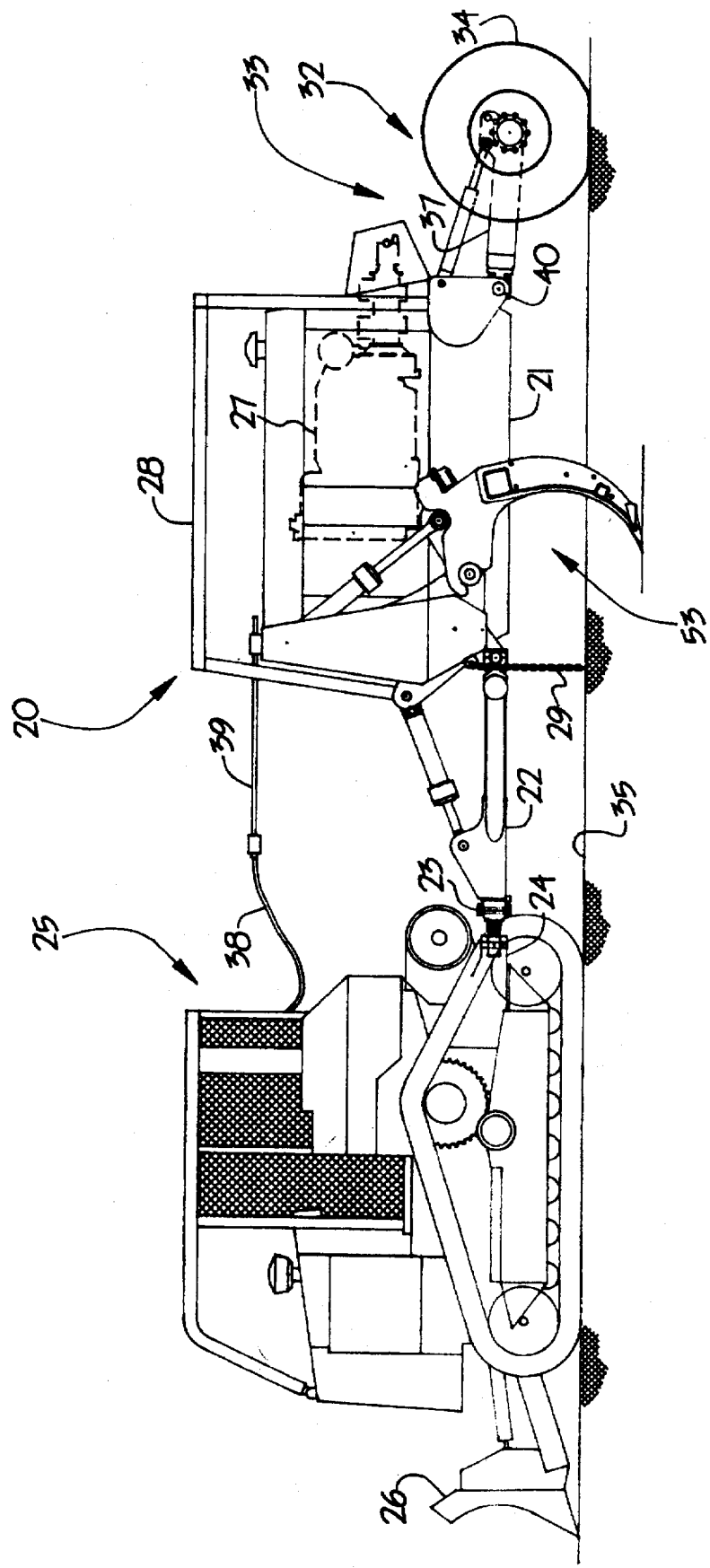
FIG. 1 is a side view of the apparatus of the present invention attached to a towing tractor with certain parts removed from the apparatus for the sake of clarity.
Figure 4A:
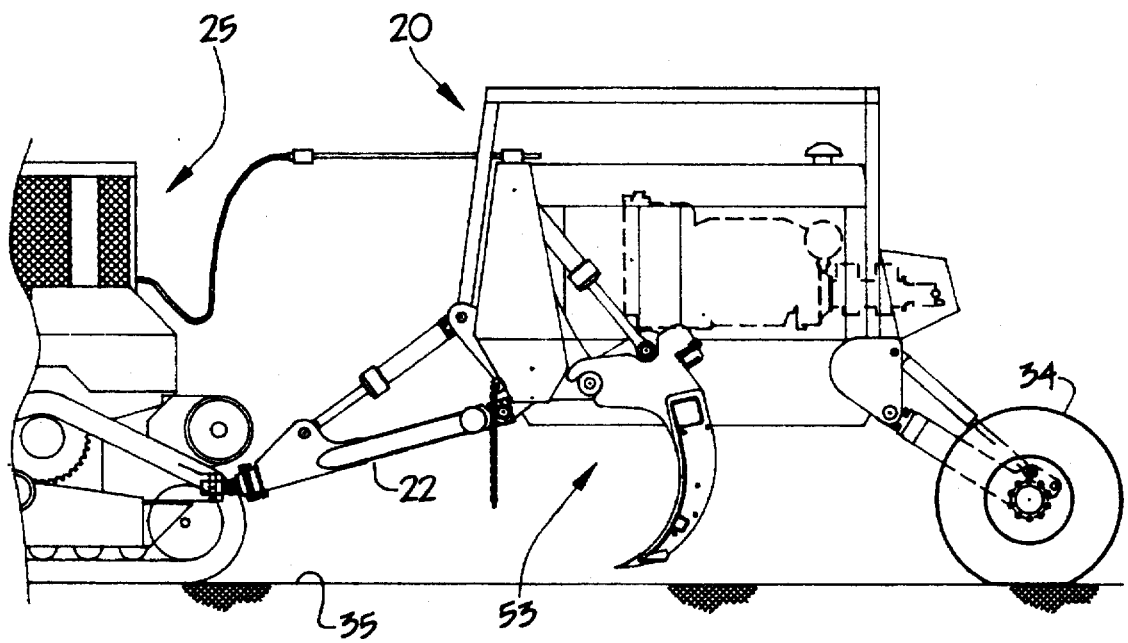
FIGS. 4A and 4B are side views of the apparatus of the present invention showing the platform in extreme raised and lowered positions.
Figure 4B:
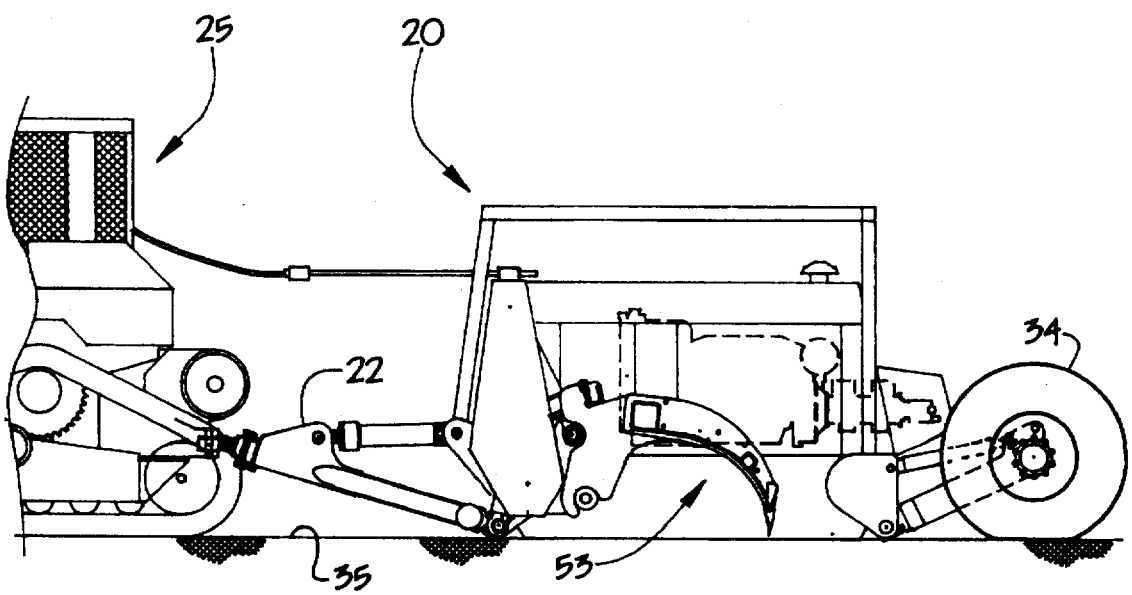

The triangular configuration formed by the towbar 22, the expandable and contractible unit 50 and the effective rigid link formed by the frame member 44 and 45 is therefore capable of transferring the weight of the forward portion of the apparatus to the rearward end of the drawbar 24 of the tractor 25. Actuation of controls available to the operator cause the cylinder 50 to expand and therefore raises the frame work 21 relative to the ground surface, or conversely, contraction of the unit 50 causes the frame work to be lowered relative to the ground. The hydraulic units 42 of the rear mounting means and the unit 50 of the hitch system may be operated independently so as to cause the framework to tilt towards the front or the back. When both units are actuated to obtain maximum lifting of the framework relative to the ground, as illustrated in FIG. 4A, the apparatus may be held in an elevated position in which a ground engaging scoop means 53, which will be described in further detail below, may be operated for testing, for example, while remaining clear of the ground. Alternatively, as illustrated in FIG. 4B, the units 42 and 50 may be actuated to the opposite extreme to allow the framework to rest on the ground 45 or any other supporting surface, such as on a flat bed during transportation. Thus, the overall shipping height is reduced, and because of the low center of gravity, the unit is stable for shipping. A plurality of lengths of chain 29 are hung in front of each scoop means 53 to deflect flying debris (FIG. 1), and by having the lengths of chain at a preselected length, the operator can judge the depth of scoop penetration when the chains touch the ground.

Figure 5:
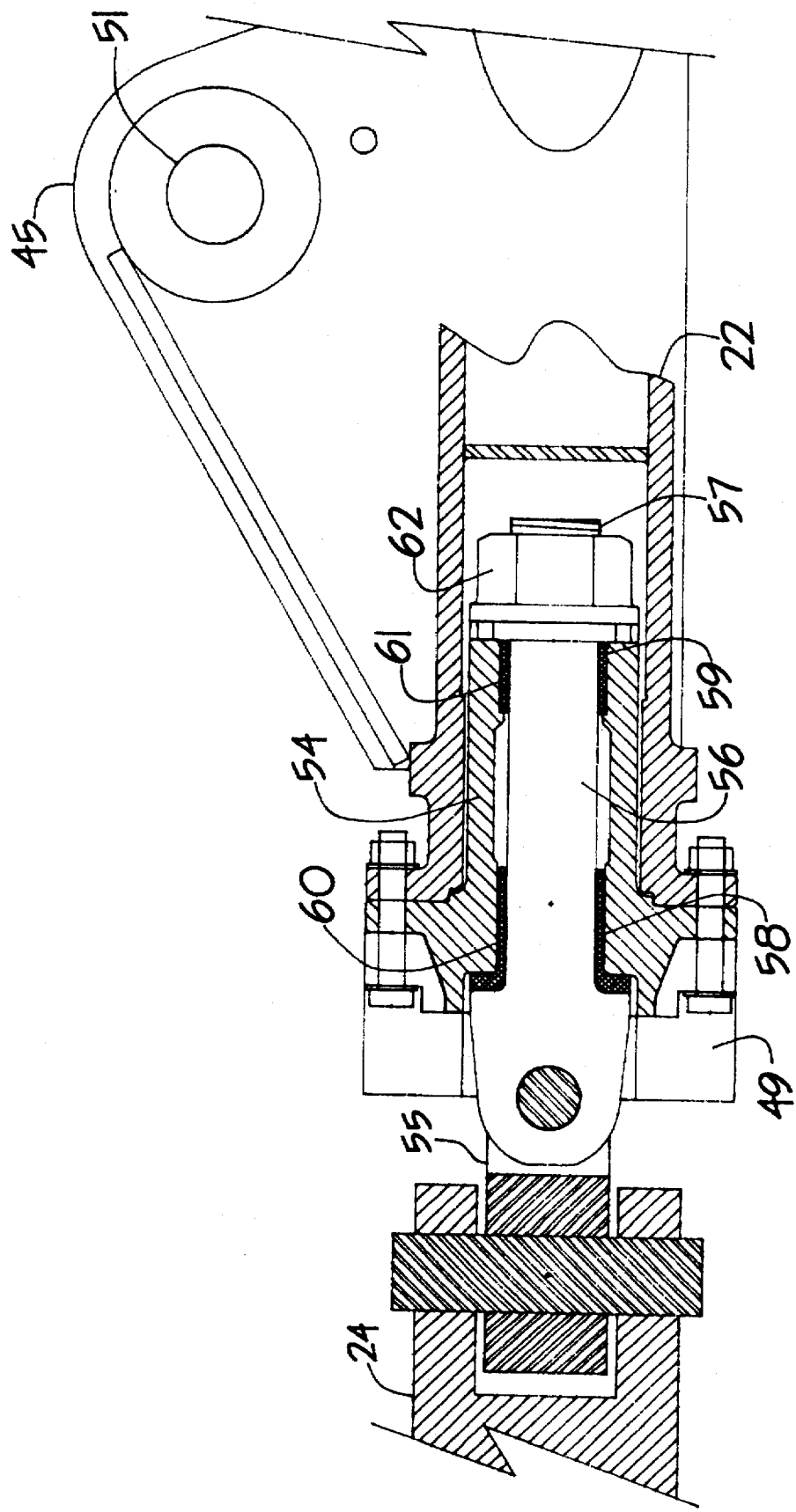
FIG. 5 is an enlarged cross-sectional view through a swivel connection means at the forward end of the towbar of the apparatus as seen from line 5—5 of FIG. 3.

In order to permit the apparatus 20 to roll about a longitudinal axis thereof relative to the tractor, the connection means 23 at the front end of the towbar 22 provides for a swivel action (FIG. 5). The front portion of the towbar 22 is of tubular form and has bolted therein a sleeve member 54 providing for and aft bushings seats 58 and 59. A link 55 which is adapted to be pin connected to the rear end of the draw bar 24 of the tractor 25 has a spindle 56 provided with a threaded rear end portion 57. The spindle is rotatably received in for and aft bushings 60 and 61 received respectively in bushing seats 58 and 59. Withdrawal of the spindle lengthwise is prevented by a nut 62 threaded on to the threaded end 57 of the spindle. This swivel connection prevents stresses developing in the framework and the towbar of the apparatus 20 as the rear wheels 34 travel over uneven ground surface as the apparatus is free to rock relative to the tractor about its longitudinal axis. However, it is preferable to provide a mechanical stop so as to ensure that the apparatus does not reach an unstable position which might result in flip over, such as when a scoop at one side engages a large solid object. The mechanical stop may be in the form of a stop collar 49 (FIG. 5) which interacts with the draw bar 24 of the tractor 25 and limits the oscillating to +/−45 degrees.

Figure 6:
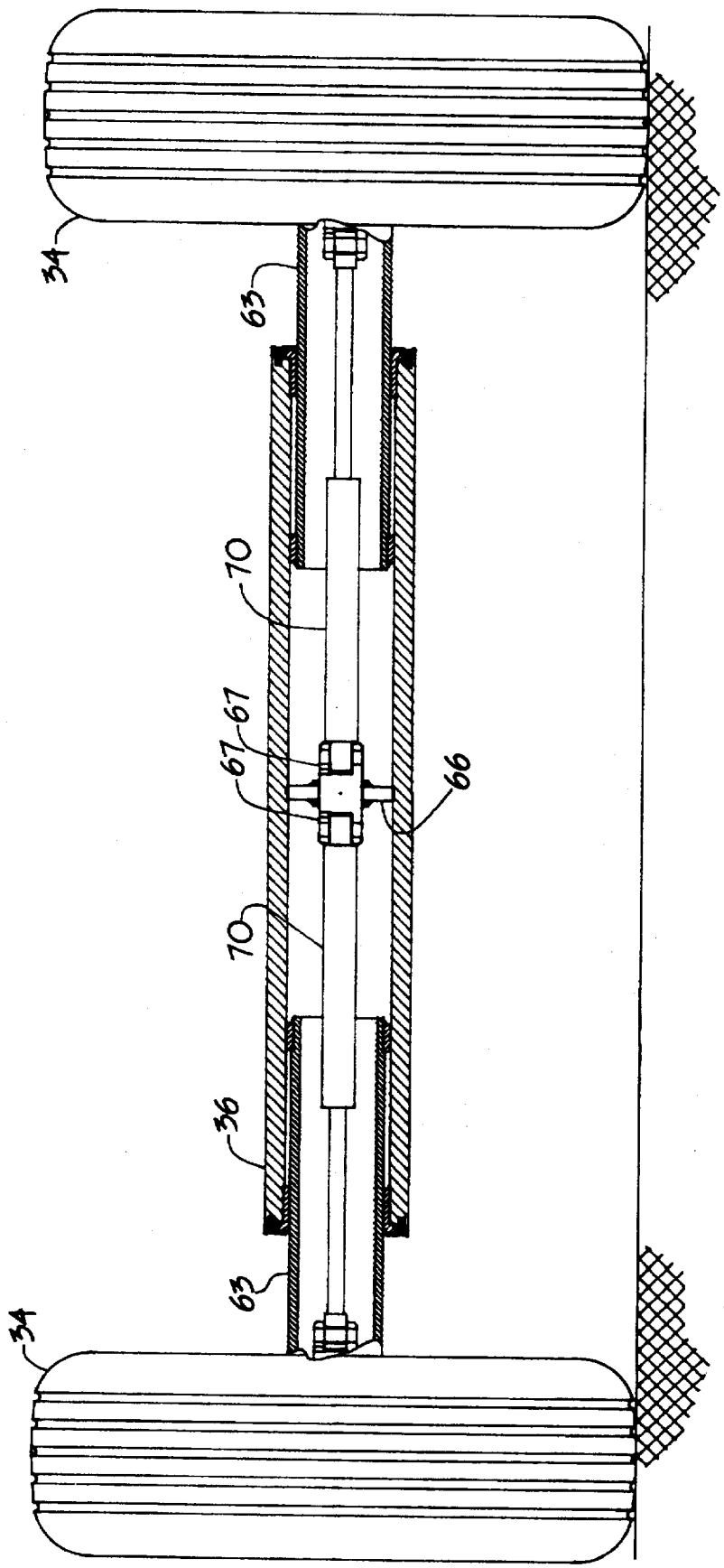
FIG. 6 is a cross-sectional view through a rear axle of rear wheel mounting means illustrating a telescoping mechanism permitting adjustment of the wheel tread or spacing.
Figure 7:
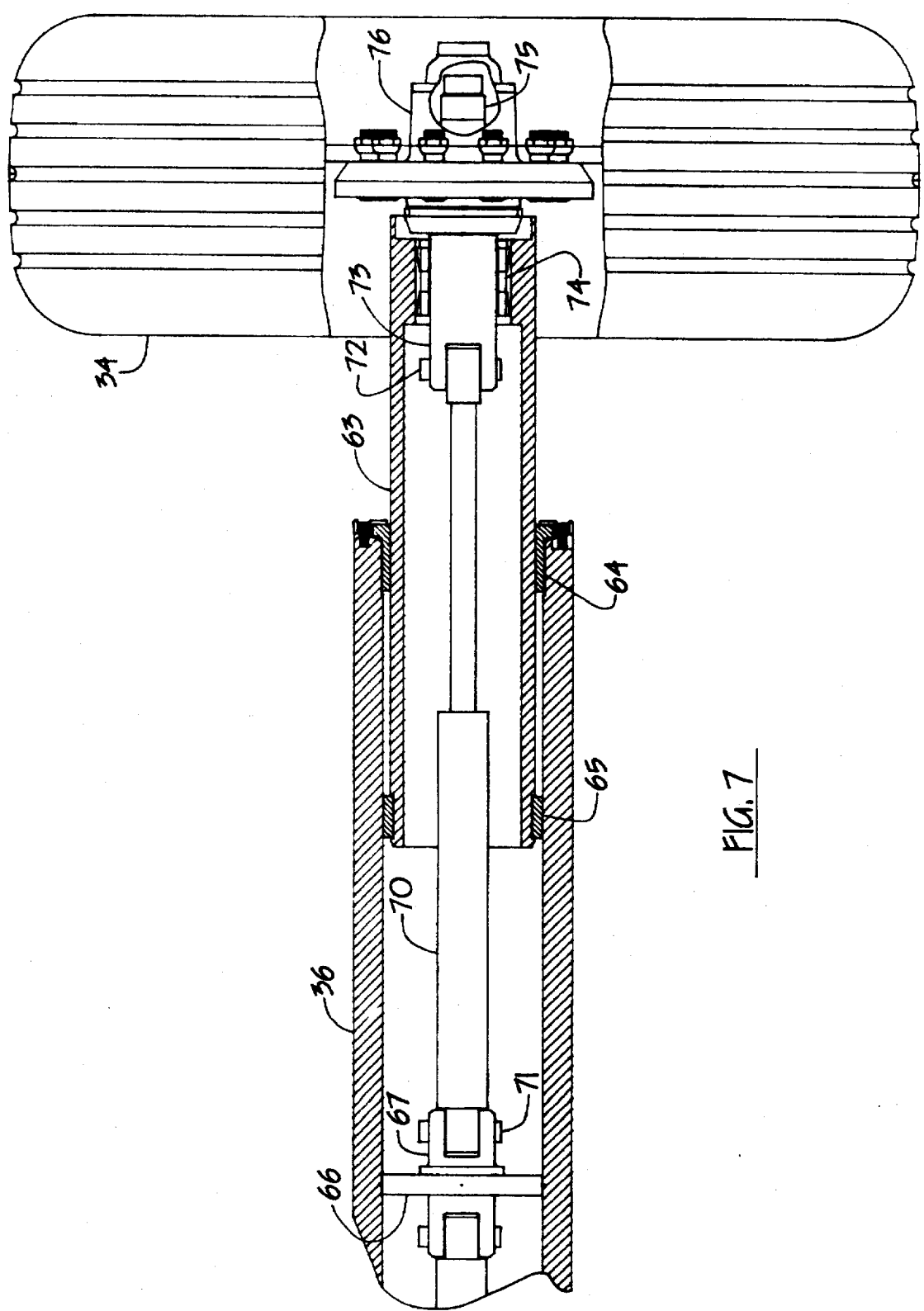
FIG. 7 is a view in cross-section of one side of the rear axle of FIG. 6, but on an enlarged scale for the sake of clarity.

Returning now to the mounting means 33 for the rear wheels 34, it may be noted in FIGS. 6 and 7 that the tubular axle housing 36 forms a central portion of the overall axle housing which further includes a pair of tubular members or sleeves 63 telescopically received within opposite ends of the tubular axle housing 36. As is more readily apparent in FIG. 7, there is seated immediately within the end of the tubular axle housing 36 a bushing 64. The sleeve 63 is of an outside diameter which is slidable longitudinally within the bushing 64. Mounted on the exterior of the inner end of the sleeve 63 is a second bushing 65 which has an exterior diameter for sliding reception within the internal surface of the tubular axle housing 36. At a central location within the tubular axle housing 36 is a rigid wall 66 which extends transversely of the tubular axle housing. Projecting axially from opposite sides of the wall 66 are opposed clevis members 67 which are affixed to the wall 66. A pair of double acting hydraulic piston and cylinder units 70 are located on opposite sides of the wall and are affixed one each to each of the clevis members by way of a pin 71. The connections to the clevis member 67 is at the cylinder end of the unit 70, and the piston end of each unit 70 is connected by way of a pin 72 to the inner end of a wheel spindle 73. The wheel spindle 73 is locked within the outer end of the sleeve 63 by way of a spindle locking collar 74. An outer end 75 of the spindle projects beyond the outer end of the sleeve 63, and there is journalled thereon a hub 76 of the wheel 34. On contraction of the piston and cylinder units 70, the wheels are drawn to a position wherein they are separated by distance only slightly longer than the tubular axle housing 36. When extended, the wheels are separated by a much greater distance. The piston and cylinder units 70 are independently controlled so that one wheel, for example, may track at a greater distance from the longitudinal axis than the other wheel.

The full benefits of being able to adjust the tracking positions of the rear wheel will become more apparent later in this description. However, it may be noted at this point that the normal maximum extended position of the wheels, i.e. the distance between the wheels might be governed by the width of the trash blades 26 being utilized in that the wheels are positioned to run inside of the trash beds on either side of the path which has been cleared. If no compacting of the mounds is required, the wheels 34 will normally run in a line outside of the formed mounds and inside of the inside line of the adjacent trash beds. However, if compacting of the mounds is required, such as under extremely dry conditions, or because of the particular type of mineral layer being exposed, the wheels 34 can be moved in so that they travel over the mounds or at least a portion of the mounds for compacting it. During shipping of the vehicle, the wheels would normally be pulled fully in by contracting the piston and cylinder units 70 so as to reduce the overall width of the apparatus.

Figure 3:
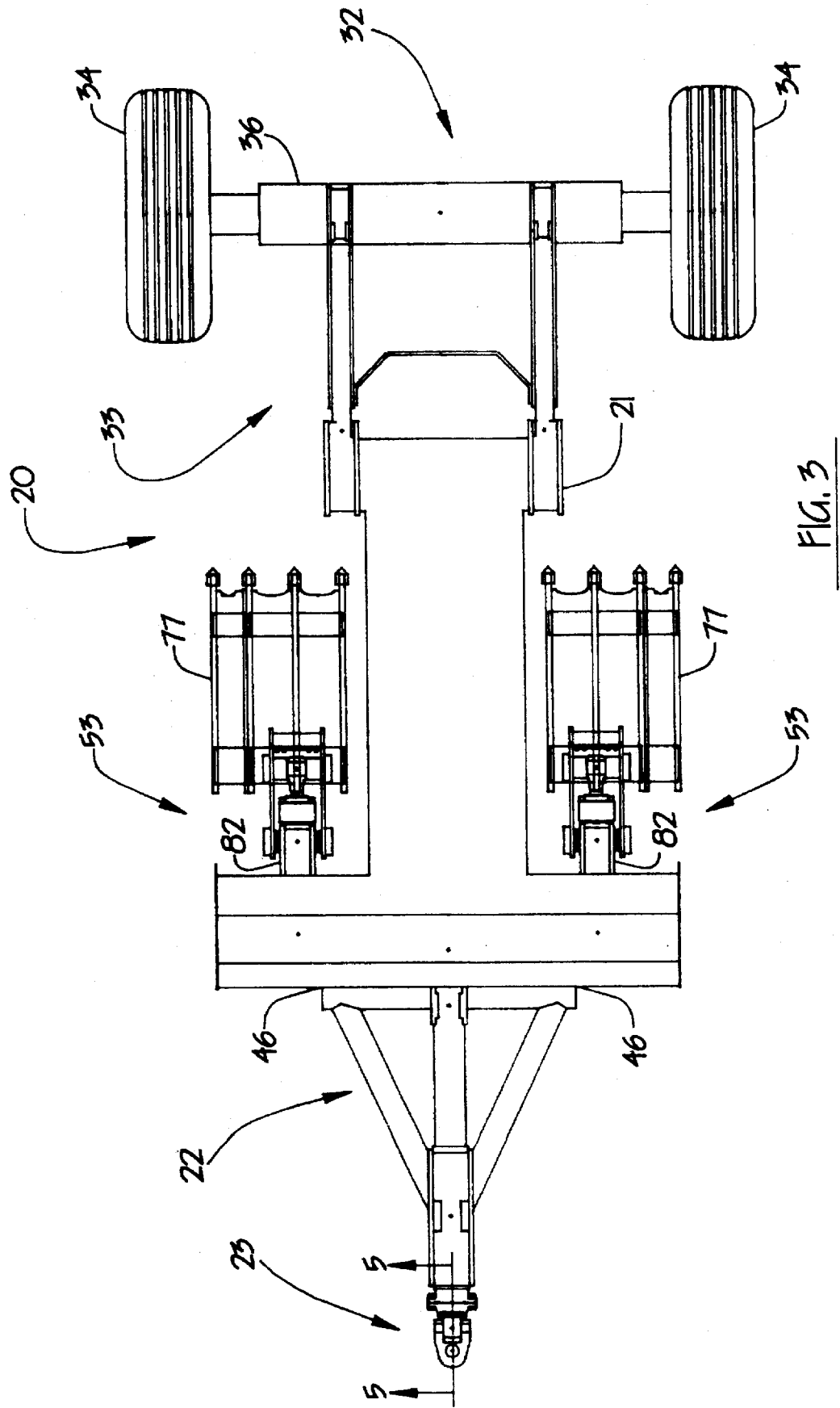
FIG. 3 is a plan view of the apparatus shown in FIG. 2 on a somewhat enlarged scale.
Figure 8:
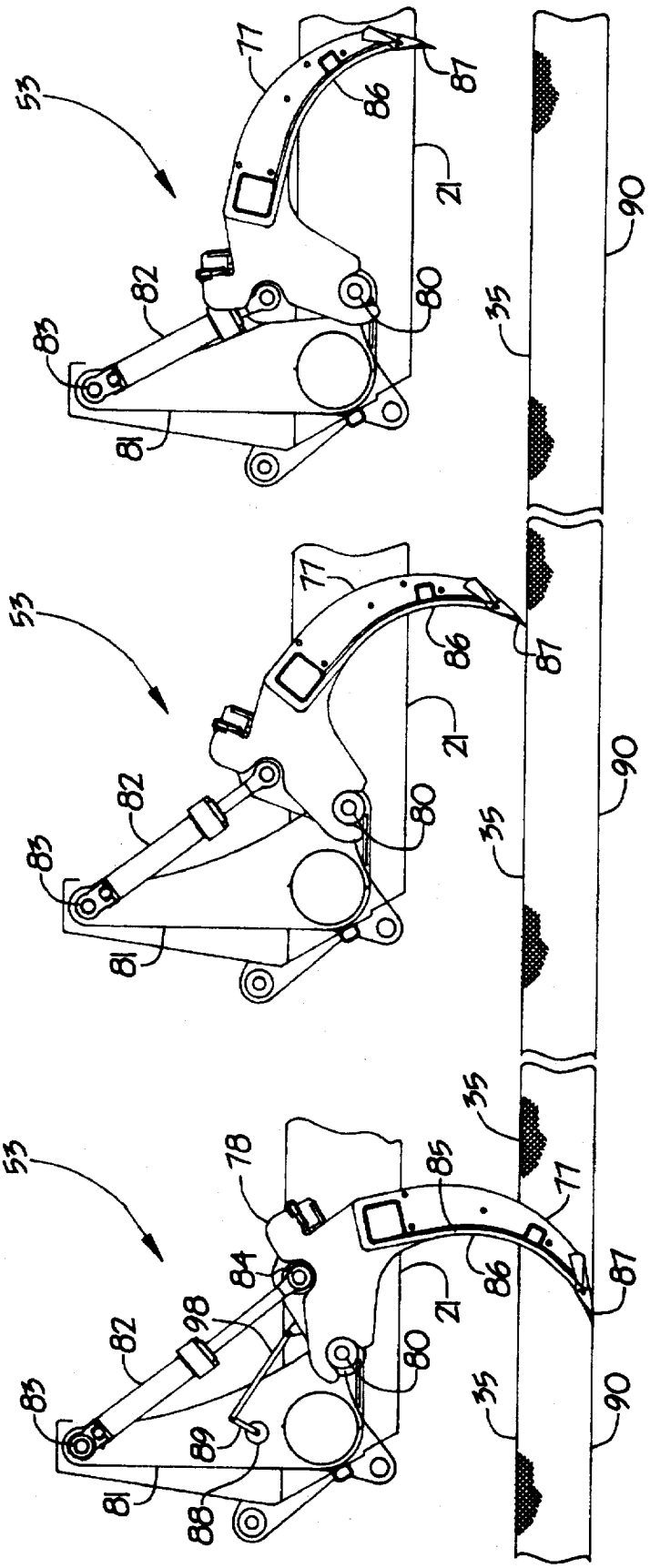
FIGS. 8A, 8B and 8C are enlarged side views of a scoop means showing the manner of its mounting on the framework of the machinery and also illustrating different operational positions.

As is apparent from FIG. 3, there are a pair of scoop means 53 which are disposed on opposite sides of the framework 21, and in the fore and aft directions of the framework 21, are preferably located so that the upward reactionary forces caused by the penetration of the scoops into the ground occurs approximately at the location of the centre of gravity of the apparatus in its fore and aft directions. By being located on opposite sides of the framework, the scoop means 53 are spaced in the transverse direction. In the embodiment shown, the scoops are arranged side by side, i.e. they are aligned in the transverse direction of the apparatus. Referring to FIGS. 8A, 8B and 8C, the scoop means 53 includes a scoop member 77 connected to the outer end of a mounting arm 78 having a bore received on a pivot pin 80 carried by an upstanding frame member 81 which is affixed to the framework 21. The pivot pins 80 of the two scoop means 53 are axially aligned in that they provide an axis of pivot which is normal to the direction of travel. The pin arrangement may be such that they provide an axis of rotation which is at a slight angle to the line which is perpendicular to the line of travel. In the arrangement shown, however, the scoop members 77 swing in an arc which is in a plane parallel to the direction of travel of the apparatus. Each scoop means 53 includes an operating, double acting, hydraulic piston and cylinder unit 82. The cylinder end of the unit 82 is pivotally connected to the frame member 81 by way of a pivot connection 83 which is disposed considerable above and slightly forward of the pivot pin 80. The piston end of the cylinder unit 82 is pivotally connected to the mounting arm 78 of the scoop member 77 a distance from the pivot pin 80.

Figure 9:
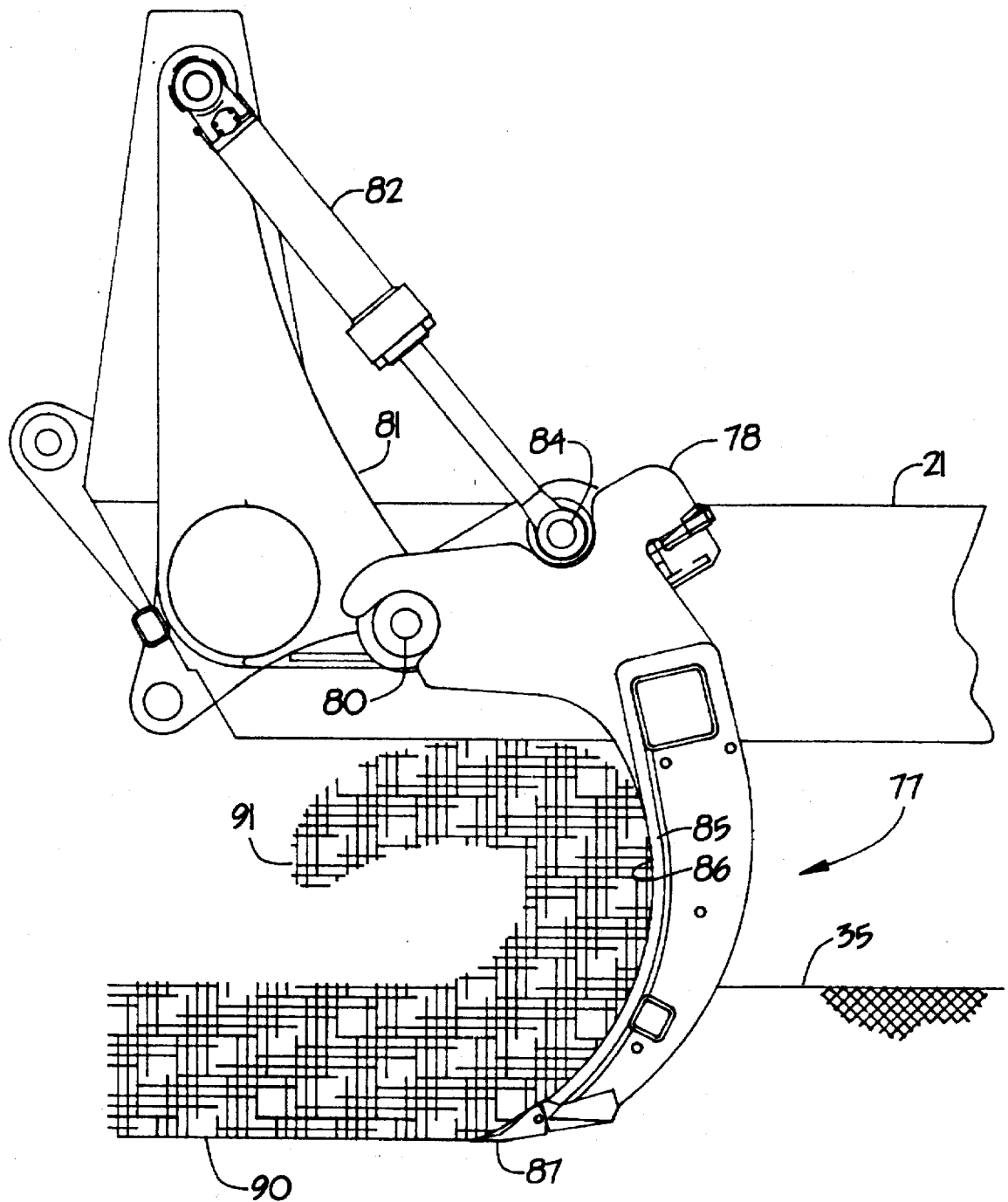
FIG. 9 is a view similar to FIG. 8 and illustrating the scoop in a stage of cycle for forming a mound in which the scoop is at its penetration stage during which soil is transferred forward to form a mound.

As may be more readily seen in FIG. 9, a front face of a plate 85 in the scoop 77 provides a concave earth engaging surface 86 as considered in cross-section on a plane extending in the longitudinal direction of the apparatus. The concave surface 86 is substantially arcuate and defined on a radius from a centre not substantially different than the distance of the pivot axis of the scoop 77 from the same centre. Thus, on pivoting of the scoop 77, the concave surface 86 swings substantially on an arc defined by its own front surface 86. In the cutting position of the scoop means, the arcuate surface extends downwardly and forwardly and terminates in a scoop tip 87. The scoop tip is actually formed by replaceable points which may be selected in different shapes for different soil conditions, including frost conditions. It can be seen that when the operating unit 82 is expanded to swing the scoop 77 into a fully penetrating position the cutting or scoop tip swings substantially in the direction it is pointing.

In the position shown in FIG. 8A, the piston and cylinder unit 82 is extended to its maximum. In normal operation, in swinging the scoop from a retracted position to a fully penetrating position does not utilize the full expanding stroke of the unit 86. In FIGS. 8A to 8C, the line 90 represents the lowermost penetration or maximum depth of penetration below the ground surface 35. As can be seen in FIG. 8A, the tip 87 of the scoop is below the line 90 then the piston cylinder unit 82 is fully extended. FIG. 8B represents an intermediate position of the scoop which during the down stroke is immediately before the scoop tip 87 commences penetration of the soil surface 35. FIG. 8C, on the other hand, shows the position of the scoop when the piston and cylinder unit 82 is fully retracted. During the mound forming process, the scoop would not be raised to the position shown in 8C. This position might be assumed when the apparatus has been lowered so that its framework 21 rests on the ground or on a transport surface as shown in FIG. 4B. On the other hand, when fully retracted during the mound forming process, the scoop would normally be in a position somewhat higher than that shown in FIG. 8B so as to clear the mound which is normally formed as the scoop reaches its most downward penetration position as indicated in FIG. 9.

Figure 10A:
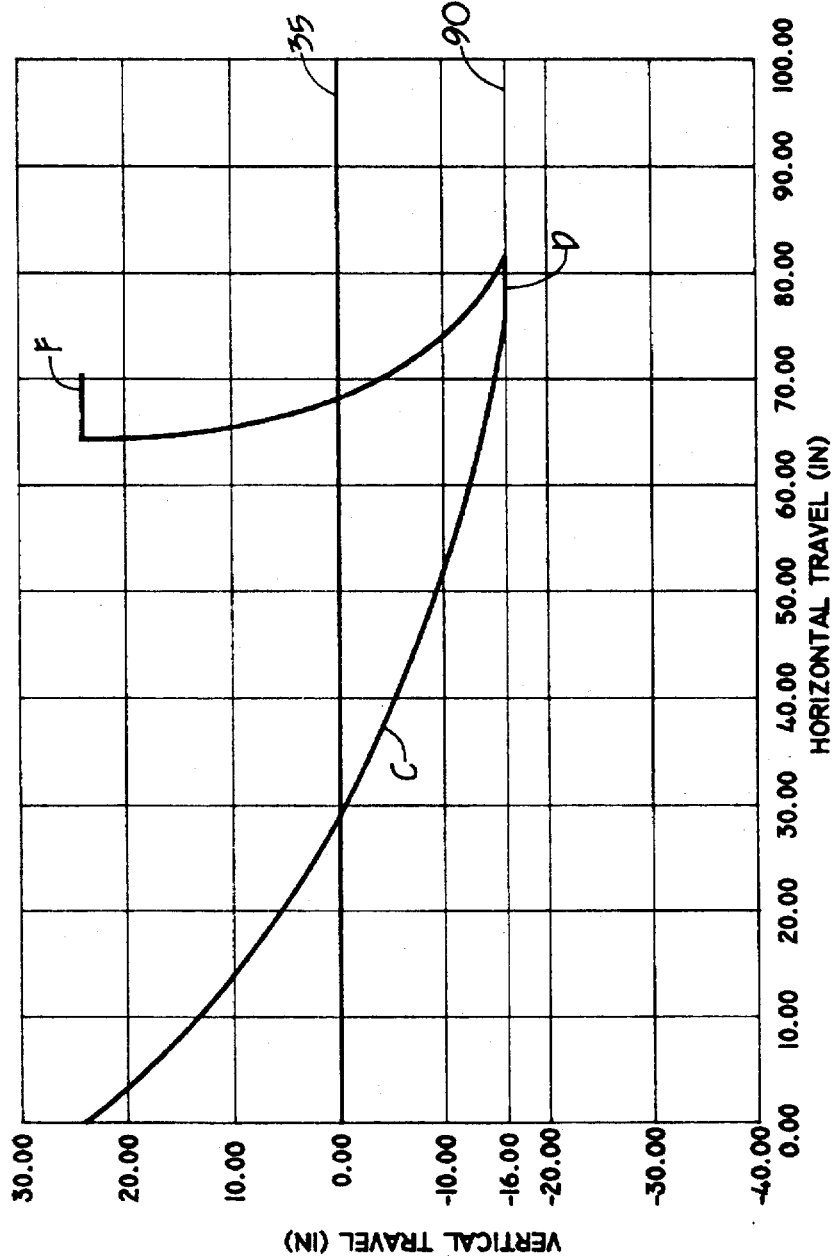
FIGS. 10A and 10B give graphical illustration of the penetration of the tip of the scoop and provides a comparison of the path of travel followed within the ground during two different retraction speeds of an actuating cylinder.
Figure 10B:
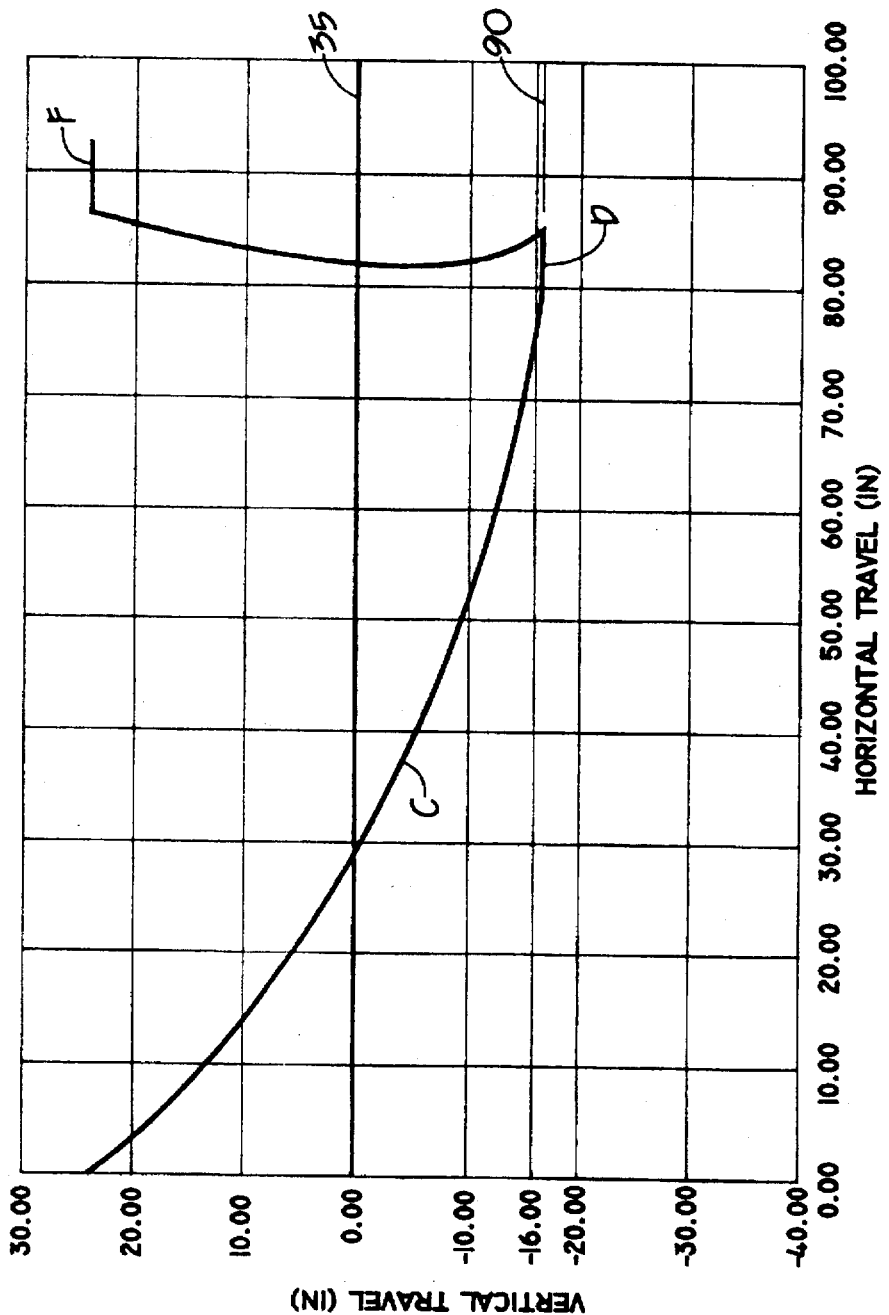

In one form of the invention, the piston and cylinder unit 82 receives pressurized fluid at a constant rate during its expansion which causes the cylinder 77 to move downwardly into a soil penetrating position, and the piston cylinder unit 82 then receives pressurized fluid at its outer end at a different constant rate during its retraction stroke. Of importance in the design of the scoop and its pivoting action during the penetration and mound forming stage of its cycle is the path which the tip 87 follows in relation to the ground. During the downward stroke of the scoop 77 because of the pivoting action, the tip initially moves downwardly relatively quickly and then because of the pivoting action, gradually commences to move more rapidly in a forward direction as represented by the line C in FIGS. 10A and 10B. This forwardly moving component of the movement of the tip is added, of course, to the ground speed of the apparatus which is preferably about 1.4 mph. In the diagrams of FIGS. 10A and 10B, the forward speed of the apparatus may be a constant forward velocity of say 1.4 mph, and preferably in the range of about 1.3 to about 1.8 mph. The outer end of the piston and cylinder unit may receive pressurized fluid, say at the rate of 45 USGPM. Another factor which affects the speed of travel of the tip 87 in the forward direction is brought about by the relative positioning of the pivot connections at opposite ends of the piston cylinder unit 82 in relation to the pivot point 80. If one considers the scoop 87 as shown in FIG. 8B as moving toward a penetration position, when the radius of the imaginary circle 91 which represents the path followed by the pivot point 84 is perpendicular to the longitudinal axis of the piston cylinder 82, the rate of pivoting of the scoop 87 reaches its maximum speed as does its ability to exert a force in penetration.

As illustrated in both FIGS. 10A and 10B, the geometry provides a direction of travel which due to the leverage increase causes the scoop to move slower in the forward horizontal direction as the tip of the scoop reaches its maximum penetration. Before the direction of travel of the piston rod in the unit 82 is reversed by admitting fluid to the rod end of the cylinder, there is a slight pause as represented by the line D in each of these Figures. During at least the initial stage of retraction, as the blade commences to retract, the initial rate of retraction of the tip 87 in the direction is in reverse to the travel of the apparatus 20 at the constant ground speed, the tip of the Scoop then actually pulls rearwardly at a faster speed than the forward speed of the overall equipment and the higher the scoop raises, the slower the reverse component relative to the frame becomes and the line E representing the travel of the tip during retraction becomes more vertical, i.e. the higher the tip travels, the faster its speed because of the cylinder mechanical arm reduces. It can be seen from FIG. 10A, however, that with the admission of 45 USGPM to the piston rod end of the cylinder, as previously given as an example, there results tip travel of the scoop with an absolute direction of travel slightly in a reversed direction. With the slower rate of admission of pressurized fluid as shown in FIG. 10B with a fluid flow, say 25 USGPM, there is eventually a slight forward movement of the tip of the blade before it becomes fully retracted. Prior to recommencing the next cycle there is a slight pause during the reversing of the piston travel in the unit 82.

In operation, the rate of admission of fluid either to the outer end or the inner end of the unit 82 may be varied to ensure that the tip of the scoop 77 has an opportunity to be pulled well above the ground surface and thereby clear the mound before it passes thereover. On the otherhand, the setting of the retracted position is such not to raise the scoop higher than necessary so as to waste time and power.

Returning to FIG. 9, the marks 91 represent the earth displacement above the surface of the earth 35 as the blade 77 moves downwardly to penetrate the earth and to in effect form a hole in front of the mound. The forward travel of the tip as represented in FIGS. 10A and 10B causes the earth to circulate within the front surface 86 of the scoop and to be flung onto the ground surface 85 in an inverted mound. Thus, a mound 69 is substantially formed before the tip of the blade follows its abrupt and possibly somewhat rearward travel to above the earth's surface 35. As indicated above, the direction of travel of the tip in possibly a slight reversed direction as it moves to its retracted position before passing over the mound which has then been formed in front of a hole 68 from which the earth has been removed.

Figure 11A:
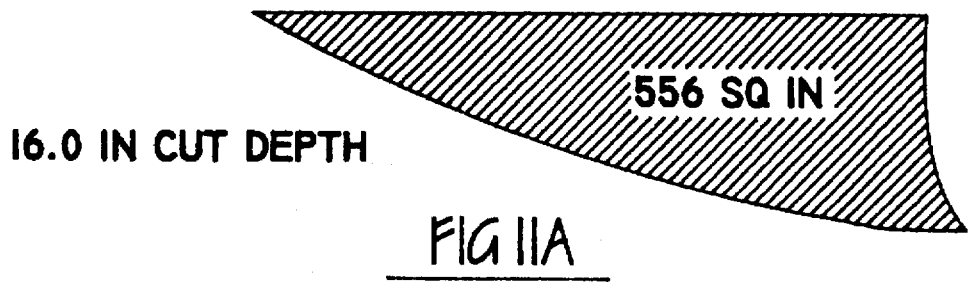
FIGS. 11A, 11B and 11C are diagrams illustrating a typical ingredient make-up of a quantity of soil which would be collected and transferred by a scoop to form a mound.
Figure 11B:
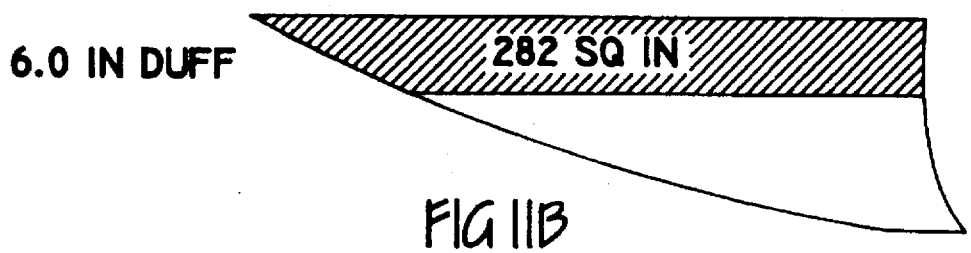
Figure 11C:
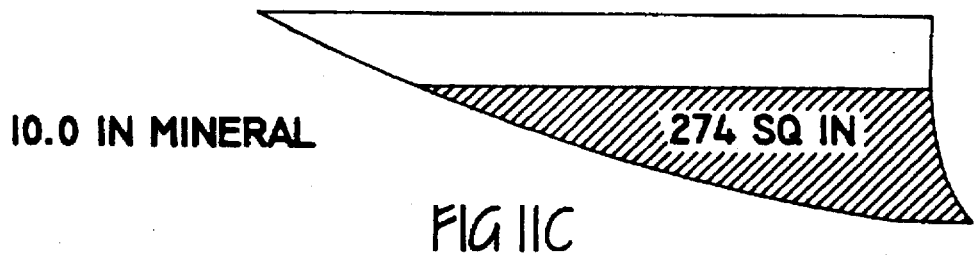
Figure 12:
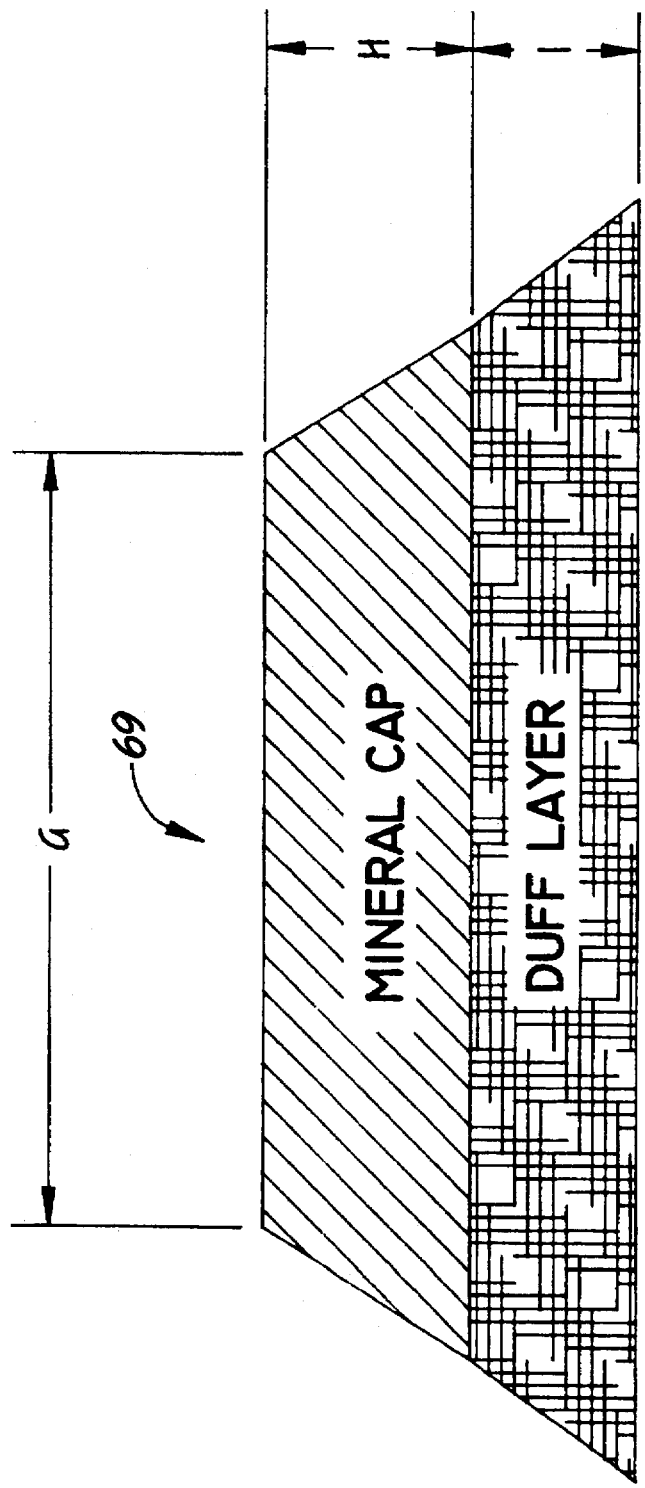
FIG. 12 is a diagram illustrating an approximate mound shape and size.

It has been found by the appropriate selection of the shape of the front surface 86 of the scoop 77 in relation to the location of the pivot 80 and the action of the expansion of the piston cylinder 82, the resulting travel of tip 87 on the line represented at C in FIGS. 10A and 10B, causes the soil to circulate in front of the curved surface 86 and be directed forward so as to be deposited in front of the hole 68 formed by the excavation. Moreover, the layers of the different ingredients of the soil remain relatively undisturbed as they are deposited to form the mound 69 in front of the hole. Looking at FIGS. 11A, 11B and 11C, the total volume is represented in cross-section by a shape which corresponds to that defined below the surface 35 by lines C and E in FIGS. 10A and 10B. For example, with a scoop which is 30 inches wide, the cross-sectional area of the hole 68 formed by the scoop action is 556 square inches with a depth cut of 16 inches and this results in a volume provided for the formation of the mound 69 in the amount of 16,700 cubic inches. In the event the depth of the duff is 6 inches, as illustrated in FIG. 11B, again based on a 30 inch wide scoop, the volume of the duff available for the duff layer of the mound 69 is in the order of 8500 cubic inches. Again, still dealing with a 16 inch depth cut, the mineral area in cross-section is 274 square inches giving a mineral or clay volume of 8200 cubic inches. Referring to FIG. 12, there is formed a mound size which has a width of about 30 inches to 40 inches, and as illustrated in this Figure, the cap length of G is equal to about 29.5 inches. The cap having a depth H equalling about 7.9 inches and the duff or bottom layer which is deposited on top of the ground surface 35 equals I or about 6.4 inches. Taking into account the above mentioned amounts of ingredients removed from the hole, the mineral cap of the mound has a volume of about 8200 cubic inches and the duff layer has a volume of about 8500 cubic inches. Such amounts are satisfactory for subsequent planting of a tree seedling.

Figure 13A:
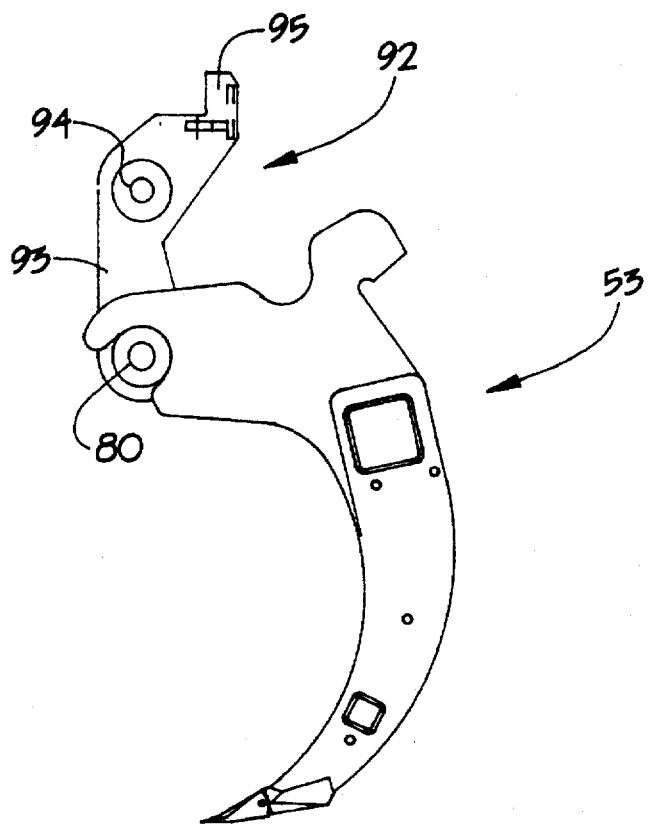
FIGS. 13A and 13B are side views of the scoop and show a quick connection mechanism.
Figure 13B:
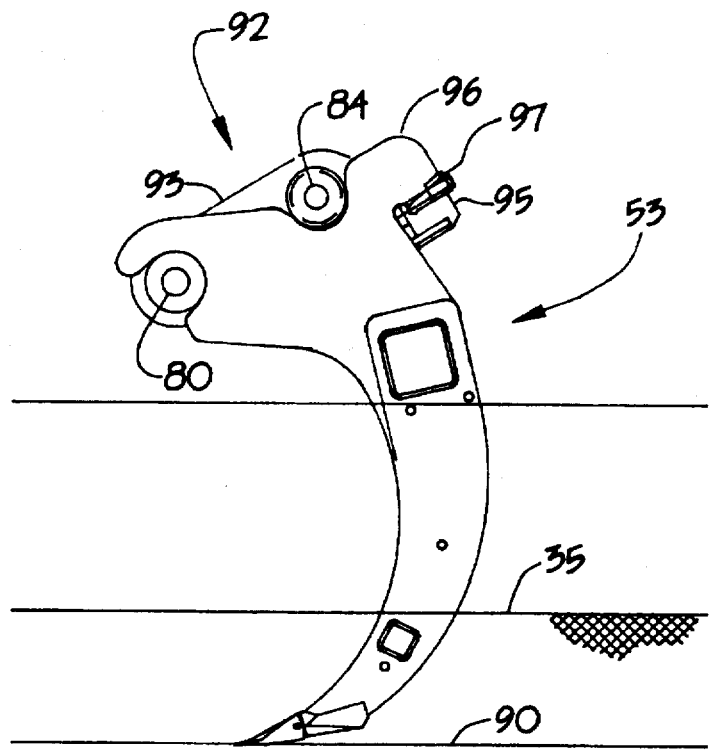

It is possible to provide alternate scoops 77 for use under different conditions, which scoops may have a somewhat different shape and may be of different widths so as to provide different sized mounds. As previously indicated, the scoop tips 87 may also be replaceable for any given scoop for better operation under different soil conditions. However, to make it possible to quickly change from one type of scoop to another, the scoop is provided with a quick attachment means shown in FIGS. 13A and 13B at 92. The quick attachment means includes a member 93 which pivots about the opening which receives the pivot pin 80 of the scoop 77. The member 93 has an opening 94 for receiving the pivot pin of the pivot connection 84 at the piston end of the hydraulic unit 82. When the member 93 is pivoted to a closed position, a flange 95 of the member 92 moves below a rearwardly extending flange 96 formed on the arm portion of the scoop 77. A wedge 97 (FIG. 13B) is then located between the flanges 95 and 96 and bolted so as to hold the member 93 in a closed position, thereby holding the scoop 77 attached to the pivot pin 80 and the pivot pin of the pivot connection 84. Thus, it can be seen that the scooping arrangement may be significantly modified very quickly by simply changing complete alternative scoops 77.

There is shown in FIGS. 14A, 14B and 14C features of the present invention which permit quick adjustment of the width of the scoop being used. The scoop may consist of a basic component 77a which has a width of 55 cm. (FIG. 14A). An extension component 77b (FIGS. 14B) may be connected to the side of the component 77a so as to increase the width of the compounded scoop as shown in FIG. 14C to 75 cm. when the width of the extension is approximately 20 cm. This attachment may be made, for example, by simple bolt connections. As the most common modification which is made to the scoop is to increase its width, the arrangements shown in FIGS. 14A to 14C provides for an economical and convenient way of simply increasing the width of the scoop 77.

As previously described, the dedicated engine 27 carried on the framework 21 of the apparatus 20 drives pumps 30 and 31 (FIG. 15) each of which is a variable displacement, load sensing, type pump. The control system includes a programmable logic control or computer unit (not shown) which is mounted within the apparatus 20. The operator of the tractor 25 has access to a control panel which is connected to the programmable logic control or computer unit by way of a cable 38 extending from the apparatus to the cab of the tractor. The control cable 38 is carried by attachment to the outer end of a boom 39 which is mounted at its inner end to the framework 21 for pivoting about a vertical axis. At the outer end of the boom the control cable 38 is provided with a quick coupling for allowing easy hook-up between the tractor 25 and the apparatus 20. There is further provided a control panel (not shown) which is accessible at the apparatus 20 for testing and setting up the apparatus even when it is not connected to the tractor.

Figure 15:
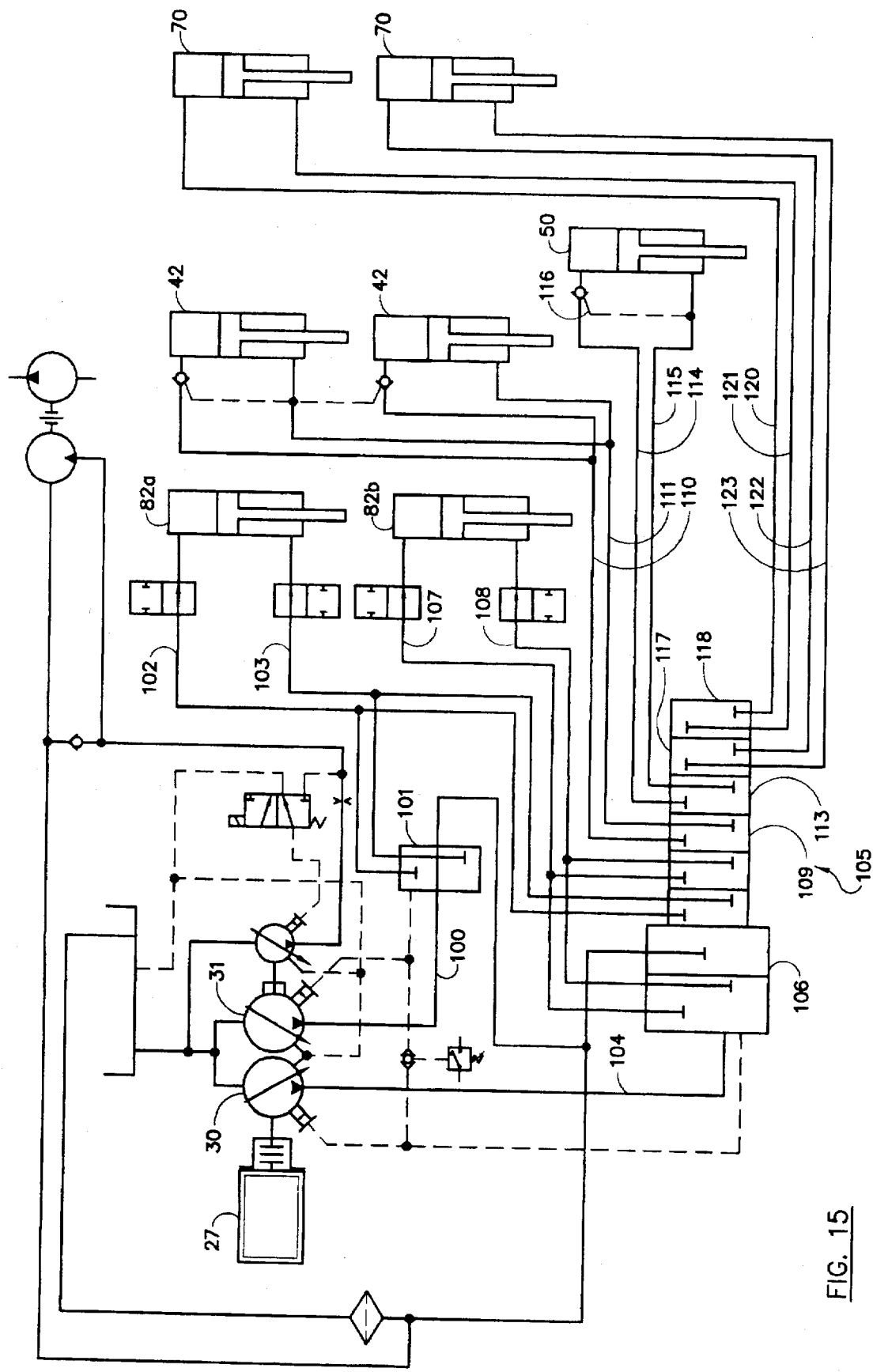
FIG. 15 is a schematic of a hydraulic control system for the apparatus of the present invention.

In the schematics shown in FIG. 15, the separate acting piston and cylinder units 82 previously referred to are shown separately at 82A and 82B. The fluid flow from variable displacement pump 31 is directed through hydraulic line 100 to a metering directional valve 101 which controls the action of the piston and cylinder unit 82A provided for the scoop means at one side of the apparatus. The metering valve 101 is provided with manually adjustment means for determining the rate of flow, which may be different, as previously indicated to opposite ends of the unit 82A. The timing of the flow of pressurized fluid to the piston and cylinder unit 82 and whether the flow is through line 102 or 103 either cause extension or contraction of the unit 82A is determined by the valve 101. The valve 101 may be of the pilot operated type which is in turn electrically controlled from the programmable computer unit. The output of variable displacement load sensing pump 30 is directed by line 104 to a compounded valve system 105 which includes a metering directional valve 106 similar to valve 101 for controlling the flow of fluid through lines 107 and 108 to opposite ends of the piston and cylinder unit 82b provided to actuate the scoop means on the opposite side of the apparatus 20 as that operated by piston and cylinder unit 82a. Like metering directional 102, metering directional valve 106 is controlled by way of electrical signals received from the programmable computer unit. The programmable computer unit is programmed to process information received from either of the control panels previously mentioned and then providing signals to the metering directional valves whereby features such as the pitch between mounds, i.e. the distance between each successive mound in the separate series of mounds provided one each by each of the two scoop means. Also, as illustrated in FIG. 8A there is mounted on frame member 81 a positional transducer 88 which has an arm 89 connected via a link 98 to a top portion of the scoop 77. Such a positional transducer need only be provided in connection with one of the scoop means 53. The positional transducer 88 provides an output signal indicative of the position of the scoop 77 in order that the programmable computer unit is provided with information indicating the action of one of the scoops 77. Thus, as a result of the information programmed therein, the programmable computer unit can establish a reference point in time from which the programming of the actuation of the pair of scoop means, and their operation relative to each other can be established. The operator may select the offset between the mounds in the two series of mounds provided by the two scoop means 53. A normal setting, for example, would be that the mound formed in one series of mounds would be located half way between two mounds of the other series. Nevertheless, under certain circumstances, this may be changed so that if the pitch, i.e. the distance between each successive mound is 180 inches, the offset while likely being 80 inches, could be varied completely so as to have the mounds exactly transversely disposed relative to the direction of travel.

As previously indicated, in addition to the advantage of being able to obtain a higher tree density by using the staggered effect, the fact that the units 82A and 82B are expanding at different times to achieve the scooping effect, allows the pumps 30 and 31 to produce their maximum power output at different times. As the maximum outputs are out of phase, a smaller size engine 27 can be used. Moreover, as the reactionary force caused by the scooping action of the two separate scooping means are not simultaneous, the required drawing power of the prime mover, i.e., tractor 25, is less.

As the output of the pump 30 delivered by line 104 is connected to the compounded valve system, the pressurized fluid output of pump 30 is also utilized for activating the piston and cylinder units 42 for controlling the height of the rear portion of the framework 21 above the ground, for activating the piston and cylinder unit 50 which controls the adjustment of the hitch arrangement so as to allow variation of the height of the front portion of the framework 21 above the ground, and also to activate the cylinders 70 which control the tracking position of the rear wheels 34. The use of such piston and cylinder units does not affect the operation of the piston and cylinder unit 82B nor require a pump of greater output.

A valve unit 109 which is electrically controlled from the control panels determines the flow of fluid through lines 110 and 111 to the piston and cylinder units 42 which are connected in parallel. Accordingly, actuation of the valve 109 to provide fluid flow through line 110 extends the piston and cylinder units 42 to lower their wheels relative to the framework. The provision of fluid via valve 109 through line 111 contracts the cylinders 42 to raise the wheels relative to the framework. The lines of this system are provided with a pilot operated load holding check valve system 112 so as to lock the piston and cylinder units 42 in their set position.

A separate electrically controlled valve unit 113 is provided for controlling the flow of pressurized fluid in lines 114 and 115 extending from the valves to the cylinder 50, which as previously described, is utilized to control the level of the framework 21. This valve is actuable separate from that of valve 109 so that the operator has the option of levelling the framework or moving it to a fore or aft titled position. There is provided a load holding checking valve system 116 for locking the position of the piston and cylinder unit 50. In relation to the two piston and cylinder units 70 which control the tracking position of the wheels 34, there are provided two separate valve units 117 and 118 connected via lines 120 and 121 and lines 122 and 123, respectively, to the piston and cylinder units 70, 70. The separate valve units which are electrically controlled therefore allow separate actuation of each of the piston and cylinder units 70 so that the tracking position of each wheel 34 may be individually adjusted.

A modified form of control system involves a computer control which continually monitors the operation of the scoops, i.e. the functioning of each scoop is tracked through its complete cycle for both pressure and position. The computer can be programmed to in effect ramp the acceleration and de-acceleration at the beginning and end of each travel of the scoop for more efficient operation. With this system it is no longer necessary to limit an abort function to one pressure setting. For example, an abort pressure can be programmed at one value for a particular part of the cycle of the scoop motion and at other values for other parts of the cycle. This allows more effective control of the abort functions. For example, it may well be preferable to about the scoop cycle at lower pressures when the scoop is entering the ground than when it is fully in the ground and in a fully forward position.

Looking now at FIG. 16, as previously described, the trash blade 26 on forward travel of the tractor 25 as it draws the apparatus 20 along during the processing of providing the mound clears a path and thus forms the trash beds shown at 124. The width of the cleared path shown at A may be, for example, 10'-8". In setting up the apparatus, the wheels 34 may be positioned so that they are equally spaced from the centre line of the apparatus and the distance B between the outside of the tires 34 is in the order of 10 ft. Each scoop means 53 provides a series of spaced mounds 69 along a line of travel, and as the pair of scoop means 53 are not aligned in the direction of travel the two lines of mounds are transversely spaced lines as shown at M and N. The distance between the centre lines of the holes 68 and mounds 69 formed by the pair of scoop means at the opposite side of the apparatus is shown at J and may be, for example, 1.80 meters. The width of each scoop in this example is 0.76 meters (30"). The hole 68 formed by the penetration and the collection of the soil for the mound extends 0.76 meters whereas the length of the mound 69 in the direction of travel is one meter. This results in a transverse spacing between the insides of the holes and the mound, shown as L equaling 1.04 meters. With the indicated setting of the tread for the rear wheels, the wheels pass along the surface at the outside edge of the hole and the amount that the wheels run over the mound, as indicated at K, equals 0.20 meters (8") where the tire width is 18.75 inches.

It is important to note, however, that while there has been described a manner of handling trash and providing mounds in relation to the positioning of the trash, the apparatus of the present invention has been found to operate satisfactory under most conditions when the trash is left in an undisturbed condition on the ground surface.

In the mound grid spacing shown in FIG. 17, the advantage of the out-of-phase spacing or staggered effect of the mounds can be appreciated. The example shown provides for 1,842 mounds per hectare, although it will be appreciated, depending on the terrain conditions, certain mounds may be missed or not satisfactorily formed for a planting site.

In making the second pass the centre line of the apparatus is spaced from the line representing its centre line on the first pass by a distance indicated by P. The value of P for the illustrated pattern is 4.60 meters. Also in this pattern the staggered distance of the direction of travel between adjacent holes on the two separate lines M and N is shown as Q which has a value of 1.18 meters. As shown in taking the second pass, the operator establishes a setting so that adjacent lines of mounds established by two consecutive pass provides the mounds also in a staggered relationship.

In the event, the individual seedlings are to be planted on spots in which the soil has been worked, rather than mounded, the design of the apparatus 20 is such that separate rotation units, such as rototiller units which may be driven by hydrostatic motors, can be mounted in place of the scoop means 53. The cylinder means 82 are then adjusted so that each rototiller unit is brought downwardly into a ground working position in the same manner as the scoops are brought to the penetrating position so that there is provided a pattern of tree planting plots similar to that shown in FIG. 17.

The apparatus 20 is also capable of having a herbicide spraying system mounted thereon so that when preparing the mounds or the worked planting plots, the terrain may be sprayed to remove competitive vegetation. Alternatively, spray heads could be substituted for the scoops 77 so that a spot pattern of herbicide sprayed areas may be achieved.

From the above, it is apparent that features of the apparatus of the present invention allow for a number of variables in relation to the operational characteristics so as to make it possible for the machine to be set up for a particular condition prior to use or in many instances during the operation by a simple adjustment from the cab of the tractor. Other characteristics of the invention provide for the forming of appropriate mounds even under adverse conditions such as uneven terrain, heavy trash conditions, soil which is difficult to penetrate as in the case of frost. Nevertheless the invention provides a machine which is economical to produce and to operate.

As initially described above, the positioning of the scoop means forward of the rearwardly mounted wheel means and rearwardly of the towbar of the apparatus of the present invention has several significant advantages. These include the fact that the amount of vertical displacement experienced by the earth working means is significantly reduced, and further that a significant portion of the total weight of the machine is available as a reactionary force to the penetration of the scoops. It is a further feature that the particular geometry of the apparatus results in a high reactive force being added to the drawbar, pushing down on the tractor 25 as the scoops encounter a high digging force. Thus, under tough digging conditions, the effective increased weight transferred to the tractor allows it to provide a higher towing force. It has been found that the reactive force is significant in that it provides an additional 30 to 50% weight on the towbar at the very time there is a heavy drawbar requirement.

Modification to the embodiment shown will be apparent to those skilled in the art without departing from the spirit of the invention as defined in the appending claims.

What we claim is:

1. An apparatus for forming mounds on the ground surface in preparation for tree planting during movement in a direction of forward travel at a selected ground speed of the apparatus over said ground surface, said apparatus comprising:

a framework, ground engaging means supporting said framework above the ground surface for said movement in the direction of travel, mound forming scoop means carried by and depending beneath said framework, said scoop means including an integral member defining an earth collection and directing front surface having a concave shape in cross-section taken in a vertical plane extending in the direction of travel, said curved surface of said scoop means having a lower portion extending downwardly and forwardly and terminating at a lowermost tip, operating means for first pivoting said scoop means about a pivotal axis in one direction through an operating cycle from an initially raised retracted position downwardly to an earth penetrating and mound depositing position and then secondly pivoting said scoop means about said pivotal axes in an opposite direction upwardly to said raised retracted position, said pivot axis being disposed forward and above said surface whereby said tip swings downwardly and forwardly during the movement to a maximum earth penetration position, said operating means including a powered actuator means for swinging said scoop means downwardly at a velocity related to the ground speed for causing said tip to penetrate the ground at a substantially constant rate over a distance of forward travel to a maximum penetration and to then swing said scoop means back in an upwardly direction at a speed related to the ground speed to cause said scoop means to raise abruptly relative to the forward travel to the fully retracted position.

2. An apparatus for forming mounds on a ground surface as defined in claim 1, wherein said scoop means includes a pair of mound forming scoops spaced transversely relative to the direction of travel, and wherein said operating means has independent power operated means for moving each scoop through said operating cycle whereby said pair of scoops each provide an in-line series of mounds spaced in said direction of forward travel, the in-line series of mounds formed by the two scoops being transversely spaced, and further comprising control means for timing the cycles of the pair of scoops in relation to each other for forming the mounds in the in-line series formed by the two scoops in a transversely staggered relationship.

3. An apparatus as defined in claim 2, wherein said control means includes adjustable means for controlling a degree of staggering as between said mounds in said two series.

4. An apparatus for forming mounds on the ground surface in preparation for tree planting as defined in claim 1, wherein said ground engaging means includes;

a pair of ground engaging wheels for travel along a tracking line during said forward travel of said apparatus, and mounting means connecting said wheels to said framework for thereby supporting a portion of said apparatus, said mounting means including power actuating wheel positioning means for adjusting the tracking line of each wheel relative to a longitudinal center line of said framework.

5. An apparatus as defined in claim 4, wherein said mounting means connecting said wheels to said framework includes power actuating means for simultaneously lowering and raising said pair of wheels relative to the framework whereby the amount of ground penetration by said scoops is variable by controlling the distance of said framework above the ground.

6. An apparatus as defined in claim 5, and further comprising a towbar pivotally attached to and projecting forward from a front portion of said framework and having a coupler means for supporting said front portions through attachment of said coupler means to a towing tractor, and power actuating means for changing the angle of said towbar relative to said framework for thereby lowering or raising the front portion of said framework relative to the ground surface.

7. An apparatus as defined in claim 1, wherein said integral unit forming said scoop means includes a first basic scoop component of a selected width, a second supplementary scoop component of a different selected width said components having like shape in cross-section taken in said vertical plane, and attachment means for connecting said components in juxtaposed side-by-side relationship to thereby increase the width of said integral unit.

8. An apparatus for forming mounds on the ground surface in preparation for tree planting, said apparatus comprising:

a framework;

a towbar projecting forward from a front portion of said framework, said towbar having coupler means at a forward end for supporting said front portion through attachment of said coupler means to a towing tractor, a pair of mound forming scoops carried by and downwardly depending from said framework, power operating means for cycling said scoops through mound forming portions of a scoop cycle during forward movement of said apparatus over the ground surface, said power operating means first pivoting each scoop means about a pivotal axis in one direction from an initially raised retracted position downwardly to an earth penetrating and mound depositing position and then secondly pivoting said scoop means about said pivotal axis in an opposite direction upwardly to said raised retracted position, ground engaging wheels supporting a rear portion of said framework rearwardly of said mound forming scoops, each wheel following a different tracking line, and power actuated means for lowering and raising said wheels relative to said framework whereby the amount of ground penetration by said scoops is variable by controlling the distance of said framework from the ground surface by way of selective positioning of said wheels relative to said framework.

9. An apparatus as defined in claim 8, wherein said towbar is pivotally connected at a rear end thereof to said framework, and further including power actuator means for changing the angle of said towbar relative to the framework for thereby lowering and raising the front portion of said framework relative to the ground surface.

10. An apparatus as defined in claim 9, wherein said power actuated means for lowering and raising said wheels and said actuator means of said towbar are individually operable.

11. An apparatus as defined in claim 8, and including operating means for independently moving each scoop through a mound building cycling, and a control means for repeating the cycle of each scoop to form a pair of series of mounds along two transversely spaced lines, said control means timing the cycles of the pair of scoops whereby the mounds in the two lines are transversely staggered.

12. An apparatus as defined in claim 8, wherein said towbar includes swivel means for accommodating an at least limited roll of said apparatus relative to said towing tractor about a longitudinal axis of said apparatus.

13. An apparatus as defined in claim 8, wherein said wheel mounting means further include wheel positioning means for adjusting the position of the tracking line of each wheel relative to the longitudinal center line of the framework.

14. An apparatus for preparation of the ground surface for tree planting, said apparatus comprising;

a framework for movement above the ground surface in a direction of travel of the apparatus during ground preparation, rear ground engaging wheels, wheel mounting means connecting said wheels to said framework for thereby supporting a rear portion of said apparatus, a pair of transversely spaced wound forming scoops carried by and downwardly depending from said frame work forwardly of said wheels, power operated means for moving said mound forming scoops through an operating cycle including a first portion of said cycle of each scoop for movement of said scoop in one direction to engage and penetrate said ground surface and a second portion of said cycle for movement of said scoop in an opposite direction to retract said scoop, said wheel mounting means connecting said wheels to said framework including power actuating means for simultaneously lowering and raising said wheels relative to the framework to thereby change the distance between the rear portion of said apparatus and said ground surface, a towbar pivotally attached to and projecting forward from a front portion of said framework and having a coupler means for supporting said front portion of said framework through attachment of said coupler means to a towing tractor, and power actuator means for changing the angle of said towbar relative to said framework for thereby lowering or raising said front portion of said framework relative to the ground surface.

15. An apparatus as defined in claim 14, wherein said power actuator means for said wheel mounting means and said power actuator means of said towbar are individually operable.

16. An apparatus as defined in claim 14, wherein said power operating means for moving said mound forming scoops includes control means for timing the cycle of each said scoop for forming the mounds in two series of transversely staggered relationship.

* * * * *

UNITED STATES PATENT AND TRADEMARK OFFICE
CERTIFICATE OF CORRECTION

PATENT NO. : 5,689,906

DATED : June 19, 1996

INVENTOR(S) : Dillman, et al.

It is certified that error appears in the above-identified patent and that said Letters Patent is hereby corrected as shown below:

ON THE COVER Page:
After "Filed: Jun. 19, 1996" please insert
--Foreign Application Priority Data
Jun. 21, 1995 [CA] Canada 2,152,338--.

Signed and Sealed this

Thirteenth Day of October 1998

Attest:

BRUCE LEHMAN

Attesting Officer

Commissioner of Patents and Trademarks